(12) United States Patent
Limatoc

(10) Patent No.: US 10,323,679 B2
(45) Date of Patent: Jun. 18, 2019

(54) ONE-PIECE SELF-LOCKING NUT

(71) Applicant: Arnold Permanent Nut, LLC, Aiea, HI (US)

(72) Inventor: Arnold R. Limatoc, Aiea, HI (US)

(73) Assignee: CRUSHLOCK, INC., Chuluota, FL (US)

( * ) Notice: Subject to any disclaimer, the term of this patent is extended or adjusted under 35 U.S.C. 154(b) by 219 days.

(21) Appl. No.: 15/221,050

(22) Filed: Jul. 27, 2016

(65) Prior Publication Data

US 2016/0333921 A1   Nov. 17, 2016

Related U.S. Application Data

(63) Continuation-in-part of application No. 14/918,035, filed on Oct. 20, 2015, now Pat. No. 10,184,508, which is a continuation-in-part of application No. 13/916,532, filed on Jun. 12, 2013, now Pat. No. 9,194,421.

(60) Provisional application No. 61/804,693, filed on Mar. 24, 2013.

(51) Int. Cl.
| F16B 39/34 | (2006.01) |
| F16B 39/286 | (2006.01) |
| F16B 39/02 | (2006.01) |
| F16B 39/12 | (2006.01) |

(52) U.S. Cl.
CPC ........... *F16B 39/34* (2013.01); *F16B 39/026* (2013.01); *F16B 39/122* (2013.01); *F16B 39/286* (2013.01)

(58) Field of Classification Search
CPC ........ F16B 39/284; F16B 39/28; F16B 39/24; F16B 39/38

USPC .............. 411/277, 278, 285, 290, 937.2, 303
See application file for complete search history.

(56) References Cited

U.S. PATENT DOCUMENTS

| 259,552 A | * | 6/1882 | Kingsley | ............... F16B 39/284 |
| | | | | 411/290 |
| 915,830 A | * | 3/1909 | Craven | ................... F16B 39/38 |
| | | | | 411/260 |
| 1,049,765 A | * | 1/1913 | Reed | ....................... F16B 39/34 |
| | | | | 411/261 |
| 1,052,601 A | * | 2/1913 | Luyties | ................. F16B 39/284 |
| | | | | 411/290 |

(Continued)

FOREIGN PATENT DOCUMENTS

| GB | 2287764 A | 9/1995 |
| JP | 2005-069254 A | 2/2005 |

OTHER PUBLICATIONS

U.S. Patent and Trademark Office, International Search Report and Written Opinion of International Searching Authority for PCT/US16/44292, dated Oct. 28, 2016 (14 pages).

(Continued)

*Primary Examiner* — Flemming Saether
(74) *Attorney, Agent, or Firm* — Nixon Peabody LLP

(57) ABSTRACT

A self-locking nut includes a main-nut body and a deformable-nut body. The main-nut body has a recess leading into an interior threaded bore forming x turns of an internal thread therein. The deformable-nut body has an outer flange and an interior threaded bore forming y turns of an internal thread therein. The outer flange of the deformable-nut body is fixed to the main-nut body such that a relief space is formed between the deformable-nut body and the recess. A ratio of x:y is about 2:1.

58 Claims, 21 Drawing Sheets

(56) References Cited

U.S. PATENT DOCUMENTS

| | | | | |
|---|---|---|---|---|
| 1,838,605 A | * | 12/1931 | Youlten | F16B 39/38 411/277 |
| 2,258,181 A | * | 10/1941 | Hinds | F16B 39/38 411/281 |
| 2,286,336 A | | 6/1942 | Brooke | |
| 2,318,398 A | | 5/1943 | Hungerford | |
| 2,320,785 A | | 6/1943 | Luce | |
| 2,374,241 A | | 4/1945 | Simmonds | |
| 2,375,325 A | | 5/1945 | Robertson | |
| 2,529,093 A | | 7/1945 | Luce | |
| 2,381,110 A | | 8/1945 | Chandler | |
| 2,389,377 A | * | 11/1945 | Manning | F16B 39/38 411/303 |
| 2,390,726 A | | 12/1945 | Mitchell | |
| 2,564,645 A | * | 8/1951 | Johnson | F16B 39/38 411/167 |
| 3,129,742 A | | 4/1964 | Faroni | |
| 3,522,830 A | | 8/1970 | Blizard | |
| 2,222,460 A | | 11/1970 | Crowley | |
| 4,019,550 A | | 4/1977 | DeHaitre | |
| 4,206,060 A | | 6/1980 | Yamamoto | |
| 5,454,675 A | | 10/1995 | DeHaitre | |
| 6,132,153 A | * | 10/2000 | LeVey | F16B 39/38 411/277 |
| 6,881,019 B2 | | 4/2005 | Wolf | |
| 8,087,863 B2 | | 1/2012 | Flaig | |
| 2014/0017028 A1 | | 1/2014 | McKinlay | |

OTHER PUBLICATIONS

U.S. Patent and Trademark Office, International Search Report and Written Opinion of International Searching Authority for PCT/US14/041272, dated Jun. 6, 2014 (10 pages).

\* cited by examiner

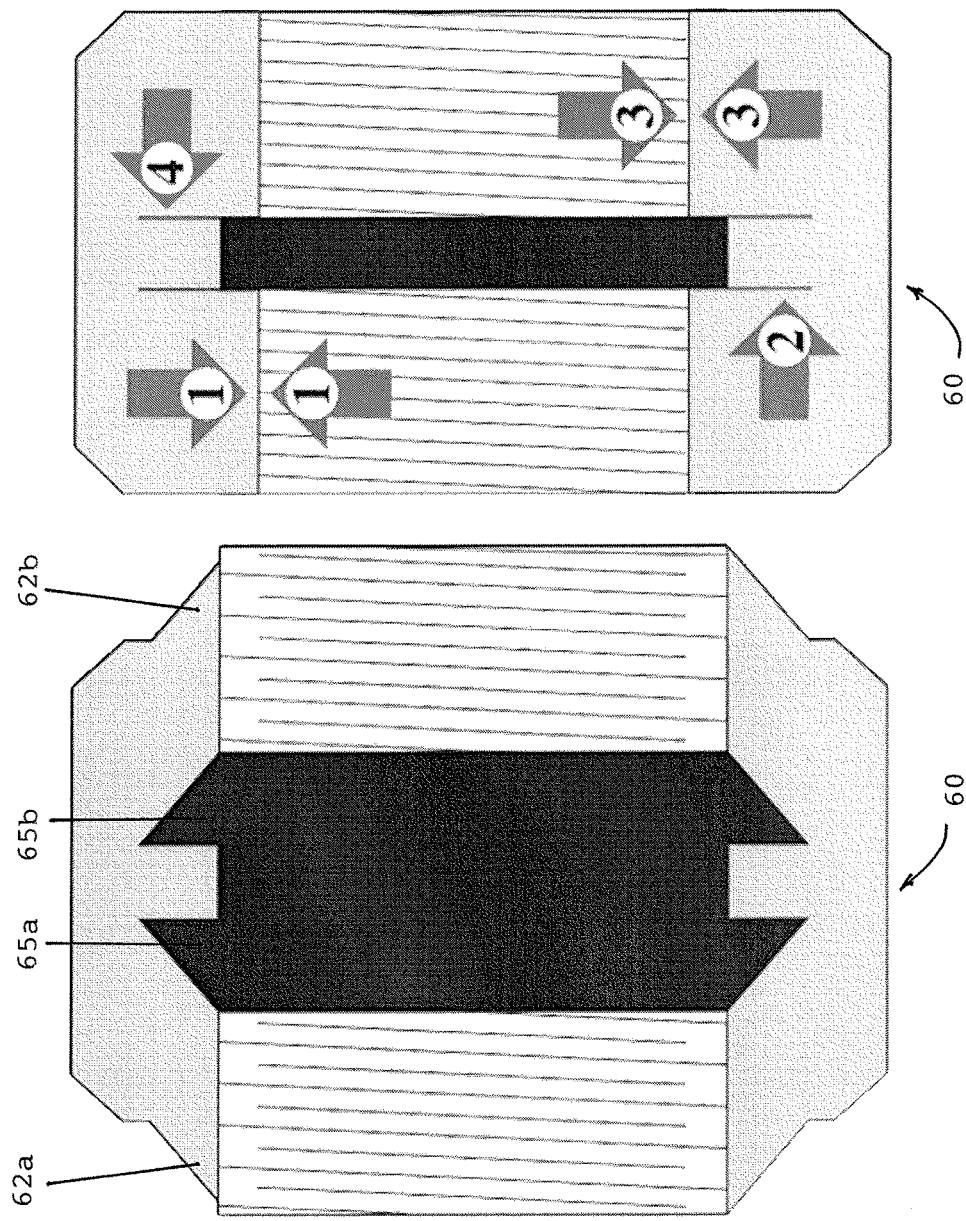

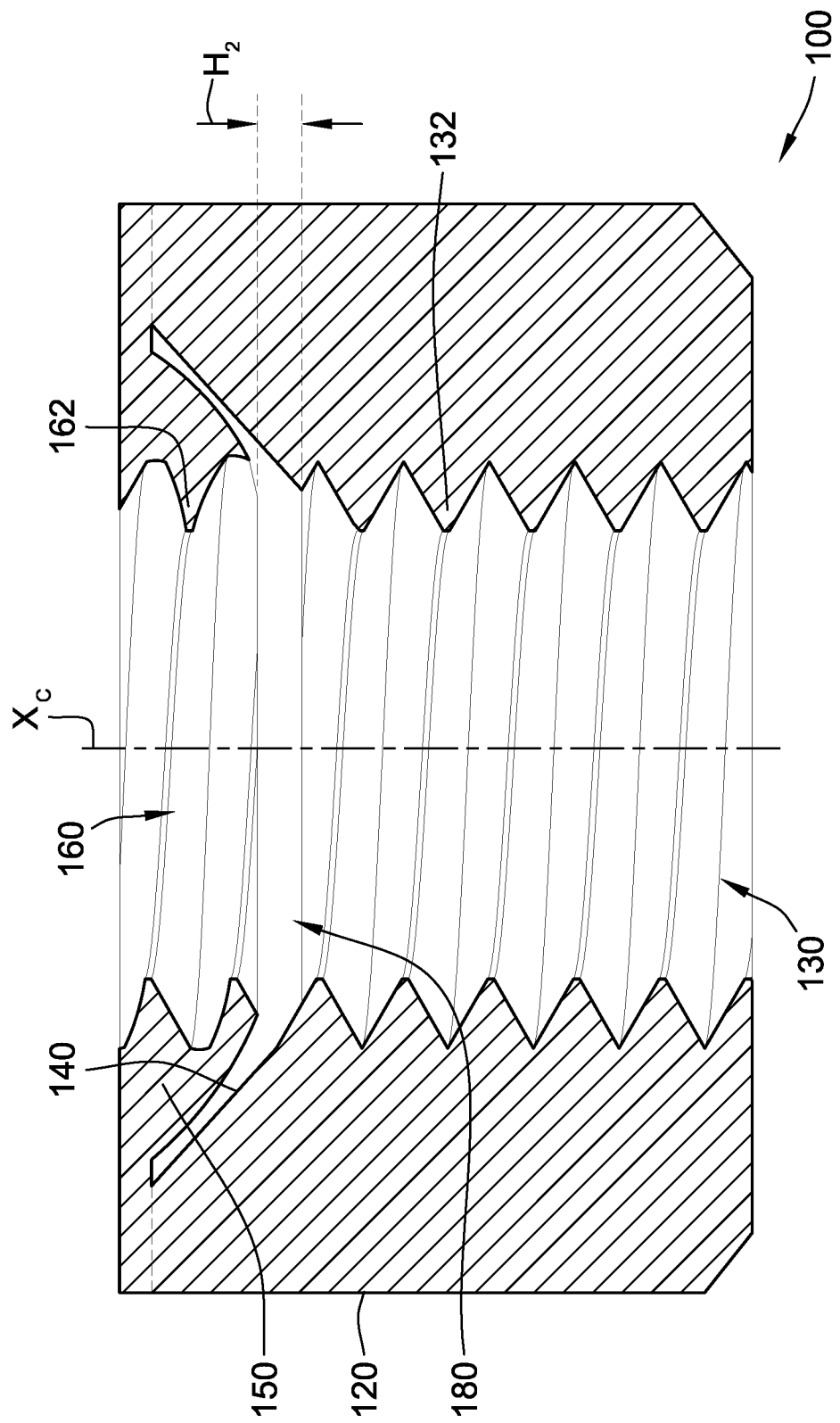

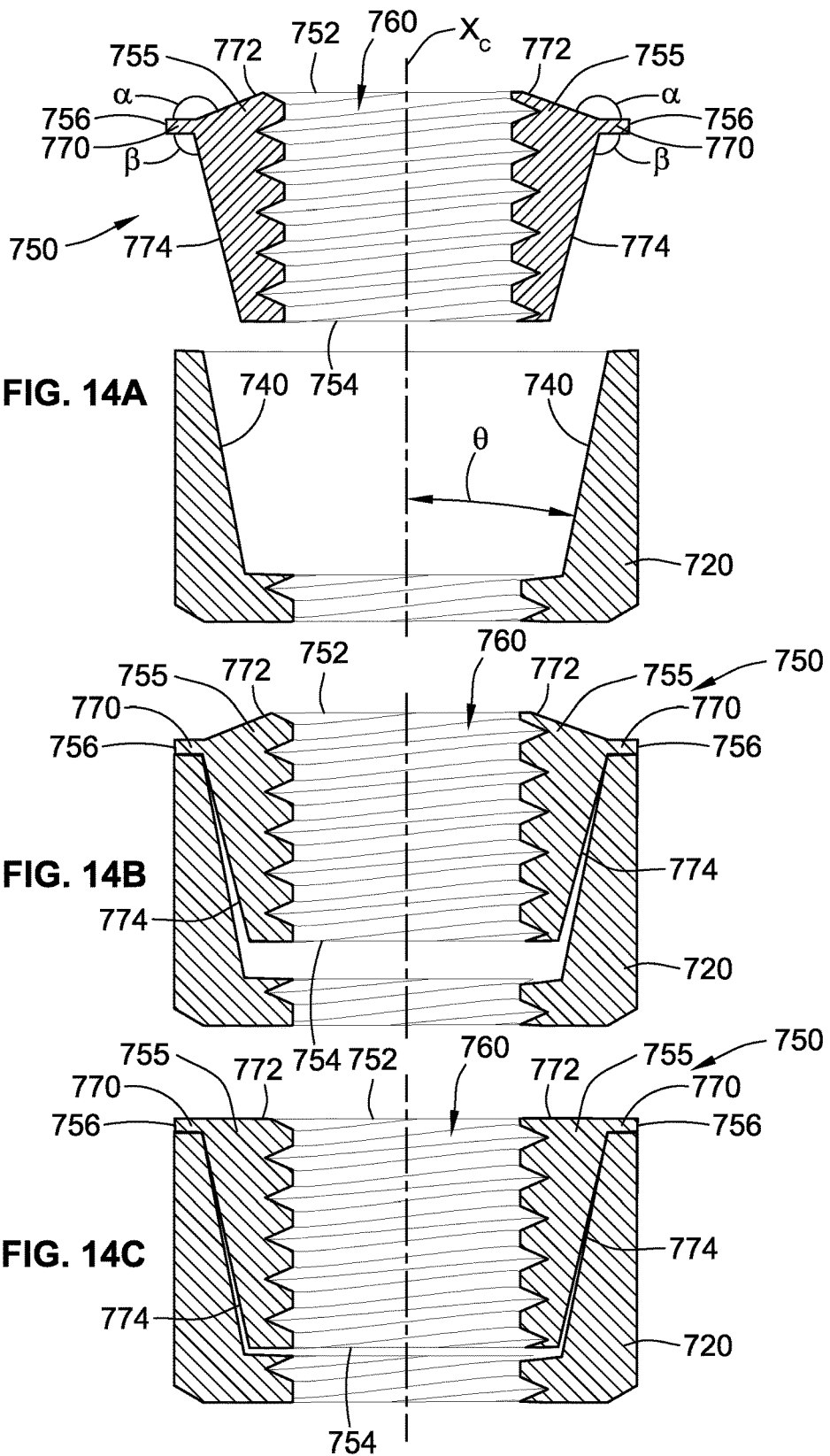

ONE-PIECE SELF-LOCKING NUT

CROSS-REFERENCE TO RELATED APPLICATIONS

This application is a continuation-in-part of prior application Ser. No. 14/918,035, filed Oct. 20, 2015, which is a continuation-in-part of application Ser. No. 13/916,532, filed Jun. 12, 2013, which claims the benefit of U.S. Provisional Application No. 61/804,693, filed Mar. 24, 2013, each of which is hereby incorporated by reference herein in its entirety.

TECHNICAL FIELD

The present disclosure relates generally to threaded nut fasteners and more specifically to one-piece self-locking nuts.

BACKGROUND

In many applications, it is desirable to have a threaded nut fastened on a threaded bolt with a permanent hold that will not loosen when exposed to high vibration environments. Conventionally, one or more locknuts may be fastened on the bolt behind the threaded nut to apply a locking force on the threaded nut to prevent it from loosening. However, the conventional use of locknuts requires added components to be used and manipulated with every permanent fastener, thereby taking up more time to install and more material to implement, and such locknuts may still be subject to loosening over time, for example in high vibration environments. The present disclosure is directed to solving these and other problems.

BRIEF SUMMARY

It is therefore a principal object of the present disclosure to provide a one-piece self-locking nut for permanent fastening on a bolt that can be readily fabricated with standard manufacturing methods and installed on a bolt with standard tools. It is a further object that the one-piece self-locking nut be easier and less expensive to manufacture, and lighter, stronger, and quicker to install than two-piece (or more) locking nuts.

In some implementations of the present disclosure, a self-locking nut is comprised of a rear nut body having internal threading for threading on a threaded shaft of a fastener bolt, and a front nut body having circumferentially arranged, crush-locking lips provided on a forward contact face of the front nut body and being spaced from the internal threading of the rear nut body by an internal relief cut for accommodating deformation of the crush-locking lips therein. When the nut is tightened down on an object on which the fastener bolt is used, the crush-locking lips are forced inwardly and deform on the threaded shaft of the fastener bolt and into the space of the internal relief cut in order to form a permanent lock on the fastener bolt.

When torqued down onto a fastener bolt, the one-piece, self-locking nut resembles a conventional nut in the locked position while forming a permanent lock, whereas the conventional nut is subject to loosening. The one-piece, self-locking nut can be fabricated by conventional nut manufacturing methods, and in use it threads on quickly like a conventional nut and installs with conventional tools. The self-locking nut installs faster and is lighter in weight without wasting added material as compared to two-piece locking nuts.

In another implementation of the present disclosure, the self-locking nut has a front "flying saucer" shaped part configured to work like a "jam nut" portion, and a rear "nut body" part having a front indentation space configured to work like an inner relief cut. The two parts are initially (e.g., prior to installation) joined together by circumferential welding and further joined together during installation thereof by a flattening and/or deforming of the "flying saucer" part into the inner relief cut space of the "nut body" part while leaving a small gap between the parts.

According to some implementations of the present disclosure, a self-locking nut includes a main-nut body and a deformable-nut body. The main-nut body has a recess leading into an interior threaded bore forming more than three turns of an internal thread therein. The deformable-nut body has an outer flange and an interior threaded bore forming less than three turns of an internal thread therein. The outer flange of the deformable-nut body is fixed to the main-nut body such that a relief space is formed between the deformable-nut body and the recess.

According to some implementations of the present disclosure, a self-locking nut includes a main-nut body and a deformable-nut body. The main-nut body has (i) a front surface, (ii) an opposing back surface, (iii) an outer surface configured to be engaged by a tool to rotate the self-locking nut about a threaded bolt shaft thereby causing the main-nut body to move axially in a first direction towards an object, (iv) an interior threaded bore forming a plurality of turns of an internal thread therein, and (v) a recess in the front surface extending into the main-nut body. The deformable-nut body has (i) a front surface configured to engage the object thereby limiting axial movement of the deformable-nut body, (ii) an opposing back surface, (iii) an outer surface, (iv) an interior threaded bore forming at least a portion of a turn of an internal thread therein, and (v) an outer flange. The outer flange of the deformable-nut body is attached to the front surface of the main-nut body such that a relief space is formed between a portion of the opposing back surface of the deformable-nut body and the recess. The relief space provides an area for the deformable-nut body to deform into during installation of the self-locking nut on the threaded bolt shaft.

According to some implementations of the present disclosure, a method of making a self-locking nut includes providing a main-nut body having a recess leading into an interior threaded bore forming more than three turns of an internal thread therein. A deformable-nut body is provided having an outer flange and an interior threaded bore forming less than three turns of an internal thread therein. The outer flange of the deformable-nut body is fixed to the main-nut body such that a relief space is formed between the deformable-nut body and the recess.

According to some implementations of the present disclosure, a method of making a self-locking nut includes providing a deformable-nut body having an outer flange and an interior bore and providing a main-nut body having a recess leading into an interior bore. The outer flange of the deformable-nut body is fixed to the main-nut body such that a relief space is formed between the deformable-nut body and the recess. The interior bore of the deformable-nut body is tapped such that less than three turns of an internal thread are formed therein. The interior bore of the main-nut body is tapped such that more than three turns of an internal thread are formed therein.

According to some implementations of the present disclosure, a method of permanently locking a self-locking nut on a threaded bolt shaft of a bolt is provided. The self-locking nut has a deformable-nut body fixed to a main-nut body such that a relief space is formed therebetween. The method includes positioning the threaded bolt shaft through an opening in an object such that a portion of the threaded bolt shaft protrudes from the opening. The self-locking nut is threaded onto the portion of the threaded bolt shaft protruding from the opening by rotating the self-locking nut in a first rotational direction, thereby causing the self-locking nut to move axially in a first direction towards a surface of the object. The self-locking nut is continued to be threaded onto the portion of the threaded bolt shaft such that a front surface of the deformable-nut body abuts the surface of the object. With the front surface of the deformable-nut body abutting the surface of the object, a rotational torque is applied in the first rotational direction to the self-locking nut to cause: (i) the main-nut body to move axially in the first direction, and (ii) the deformable-nut body to deform, thereby entering into the relief space formed between the deformable-nut body and the main-nut body, thereby locking the self-locking nut onto the threaded bolt shaft of the bolt.

According to some implementations of the present disclosure, a self-locking nut includes a main-nut body and a deformable-nut body. The main-nut body has a recess leading into an interior threaded bore forming x turns of an internal thread therein. The deformable-nut body has an outer flange and an interior threaded bore forming y turns of an internal thread therein. The outer flange of the deformable-nut body is fixed to the main-nut body such that a relief space is formed between the deformable-nut body and the recess. X is greater than y. In some such implementations, a ratio of x:y is about 2:1. Alternatively, the ratio of x:y is about 3:1. Alternatively, the ratio of x:y is about 4:1.

Other objects, features, and advantages of the present disclosure will be explained in the following detailed description having reference to the appended drawings.

BRIEF DESCRIPTION OF DRAWINGS

FIGS. 6A-6B illustrate a one-piece, self-locking nut having equalized two-sided crush-locking lips according to some implementations of the present disclosure;

FIG. 10I is a front cross-sectional view of the self-locking nut of FIG. 10H with the threaded bolt removed for illustrative purposes showing the deformation of the deformable-nut body;

FIG. 14A is an exploded front cross-sectional view of a self-locking nut according to some implementations of the present disclosure;

FIG. 14B is an assembled front cross-sectional view of the self-locking nut of FIG. 14B;

FIG. 14C is a front cross-sectional view of the self-locking nut of FIG. 14B after being installed (e.g., fully torqued on a threaded bolt with the threaded bolt removed for illustrative purposes) showing the deformation of a deformable-nut body of the self-locking nut;

Figure 1B:
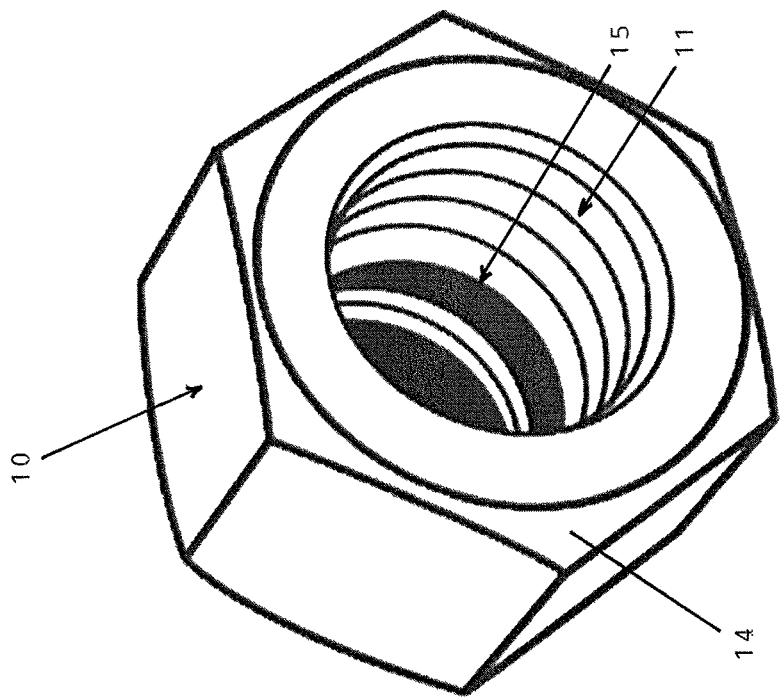
FIG. 1B is a rear perspective view of the one-piece, self-locking nut of FIG. 1A.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 1A:
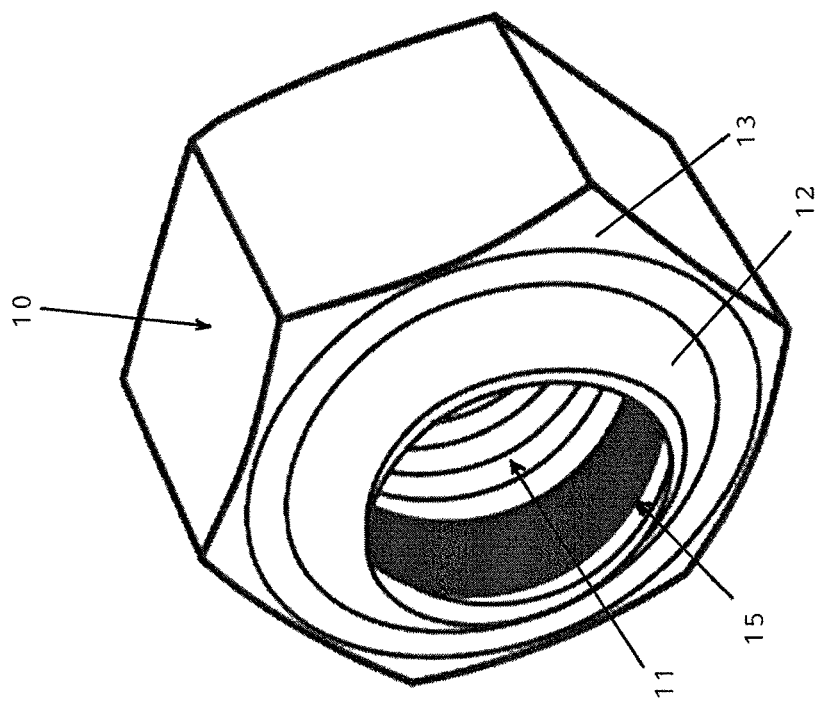
FIG. 1A is a front perspective view of a one-piece, self-locking nut according to some implementations of the present disclosure.

FIG. 1A is a front perspective view of a one-piece, self-locking nut in accordance with the present disclosure, and FIG. 1B is a rear perspective view thereof. The one-piece, self-locking nut has a nut body 10 with internal threading 11 for threading on a threaded shaft of a fastener bolt, and is integrally formed with external, crush-locking lips 12 provided on a forward contact face 13 of the nut body 10. The forward contact face 13 of the nut is typically beveled or provided with a slight convex curvature, while the rear face 14 of the nut is typically planar. The dark area 15 indicates a space for deformation of the crush-locking lips 12. When the nut is tightened down on an object (e.g., one or more plates being bolted together) on which the fastener bolt is used, the external, crush-locking lips 12 are forced inwardly and deform on the threaded shaft of the fastener bolt toward the internal threading 11 of the nut body, thereby locking (e.g., in a permanent fashion) the one-piece, self-locking nut on the fastener bolt.

Figure 2A:
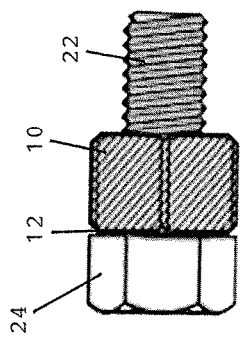
FIGS. 2A-2E are sectional views illustrating how crush-locking lips of the one-piece, self-locking nut of FIGS. 1A and 1B are forced inwardly to deform on a threaded shaft of a bolt in order to form a permanent lock.
Figure 2C:
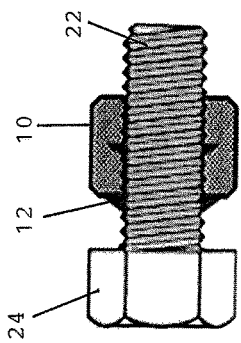
Figure 2B:
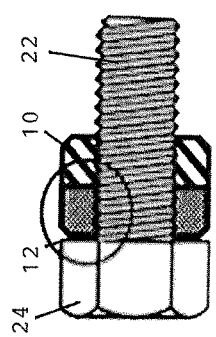
Figure 2D:
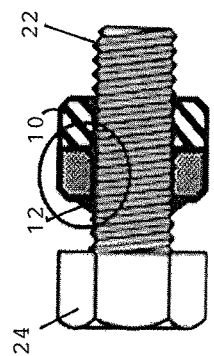
Figure 2E:
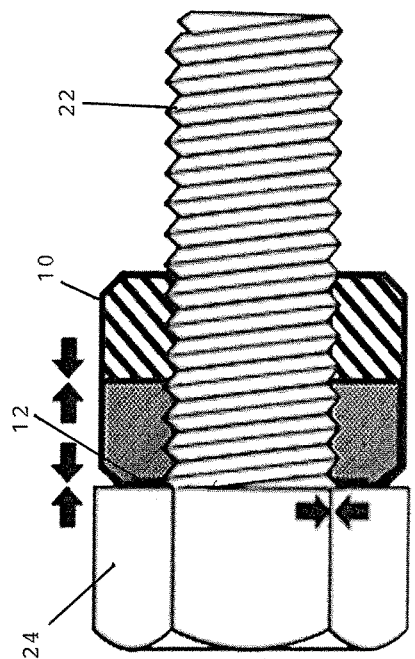

FIGS. 2A-2E are sectional views illustrating how the crush-locking lips of the one-piece, self-locking nut are forced inwardly to deform on the threaded shaft of a fastener bolt such that the one-piece, self-locking nut is locked (e.g., permanently) on the fastener bolt. In FIG. 2A, the one-piece, self-locking nut crush-locking lips 12 is threaded on a threaded shaft 22 of a fastener bolt toward an object to be permanently fastened. In the figures, the object to be fastened is not shown, and the bolt head 24 is used for illustration. In FIG. 2B, the nut is torqued down on the fastener head 24 (object) causing the crush-locking lips 12 to deform inwardly toward the other threads of the nut body 10. In FIG. 2C, the nut is shown partially in section before it is torqueing down, and FIG. 2D shows the nut after torqueing down. FIG. 2E is an enlarged view showing the nut in permanent locking position, with the horizontal sets of arrows indicating the compressive forces between the internal side of the crush-locking lips and the nut body and between the external side of the crush-locking lips and the fastener head 24 (object) that keep the nut in the permanent locking position. The vertical arrows indicate the torqueing forces on the nut.

Figure 3:
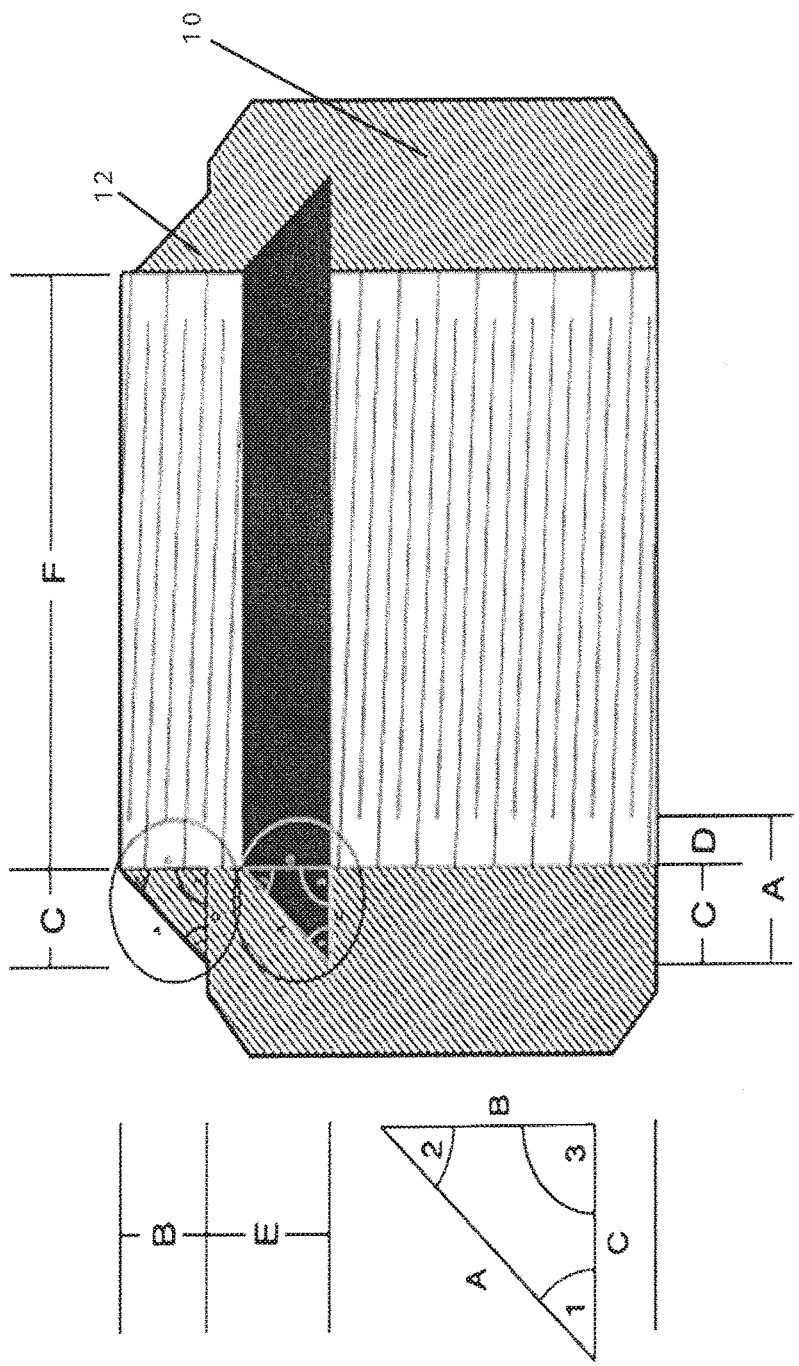
FIG. 3 is a cross-sectional view of the one-piece, self-locking nut of FIGS. 1A and 1B illustrating its geometry and dimensions according to some implementations of the present disclosure.

FIG. 3 illustrates exemplary geometry and dimensions for the one-piece, self-locking nut according to some implementations of the present disclosure. The crush-locking lips 12 on the forward face of the nut body 10 may be of isosceles right-triangular cross-section arranged circumferentially around internal threading 11. The triangular cross-section may have right angle #3=90°, and corner angles #1 & #2=45°. The base width "C" is approximately equal to the height "B" of the crush-locking lips 12. The base width may be about fifty percent of the width of the walls of the nut body 10. The hollow space 14 for deformation of the crush locking lips 12 may be similarly dimensioned to accommodate the deformation of the crush-locking lips 12 with internal threading 11 therein. The pitch depth of the threading is indicated as "D," and the combined dimensions of the base width "C" and the pitch depth "D" should be approximately equal to the hypotenuse length A of the crush-locking lips 12 to accommodate its deformation therein. The deformation distance from the crush-locking lips to the space 14 is indicated as "E," which may be +/−10% to 20% of the nut height. The deeper the internal relief cut, the more vibration resistance the nut provides. The inner diameter of the nut threading 11 is indicated to be "F." The nut is preferably made of a metal material such as type 304 stainless steel, grade 2, super alloy.

As an example, the self-locking nut of half-inch diameter threading at twenty threads-per-inch ("tpi"), made of type 304 stainless steel, would have a target maximum torque of one hundred and twenty foot/pound (ft/lbs), for applying about 10,000 pounds of compression pressure, and about 7,500 pounds of clamp force. In this example the thickness of the lip material must fully collapse/seat at 8000 pounds to 9000 pounds of pressure. If the external self-locking lip does not fully seat at the desired pressure, the thickness of the external self-locking lip must be reduced until it does.

The self-locking nuts of the present disclosure may be made of any standard nut materials including brass, steel, stainless steel, titanium, plastic, nylon and other materials depending on usage specifications and demands. The self-locking nuts may be manufactured using conventional nut manufacturing methods, such as cutting/turning on a lathe from a single piece of material, hot forming or forging, cold forming, and/or computer-controlled or automated methods of manufacture including three-dimensional printing.

The one-piece self-locking nut functions like two nut portions, one a "regular nut" body and the other a thinner "jam nut" with crush-locking lips that are combined together. The jam nut functions, in part, like a wavy/crush washer that is attached to the nut body. When torqued into the locked position, the material of the crush-locking lips will be deformed by compression forces into the space of the internal relief cut formed between the two parts. The crush-locking lips, which are on the contact face of the nut, thread onto the bolt shaft like a conventional nut until contact is made with an object to be fastened (e.g., the head of the bolt). As torque is applied, the crush-locking lips will start to be compressed into the threads of the bolt and the internal relief cut. As more torque is applied to overcome the resistance of the deforming crush-locking lips (e.g., which are unable to rotate), the gap between the two nut parts begins to close as the two nut parts are compressed together. The "back nut" is encapsulating the "front nut" which is being pushed into the "back nut" because it is unable to rotate. The "back nut" compression acts like a hydraulic press to push the "front nut" into the internal relief cut.

Once the target maximum torque is applied, the two nut parts seat together completely and the combined unit resembles a conventional nut. Since the "front nut" is locked on to the threads of the bolt, the nut cannot be loosened or removed without cutting the nut and/or the bolt threads. The self-locking nut has more vibrational resistance than two conventional nuts torqued to the bolt against each other, even when welded together. The self-locking nut also creates clamp forces by the "front nut" pinching the bolt perpendicular to the internal relief cut, and has more clamp strength than a comparable conventional nut because of the self-locking forces.

The one-piece, self-locking nut may be formed in other variations depending on the intended environments of usage.

Figure 4B:
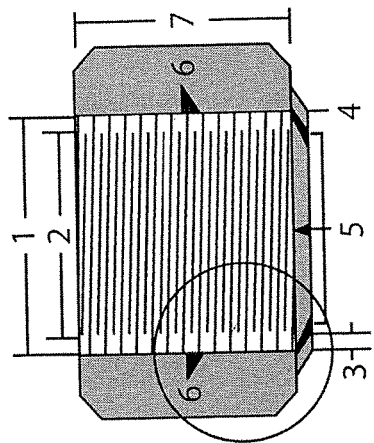
FIGS. 4A-4C illustrate a one-piece, self-locking nut having slotted crush-locking lips according to some implementations of the present disclosure.
Figure 4C:
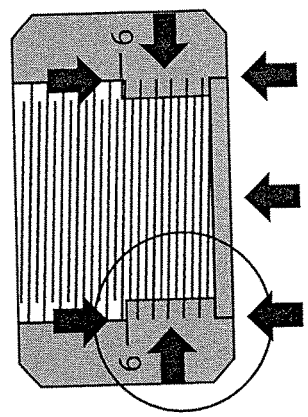
Figure 4A:
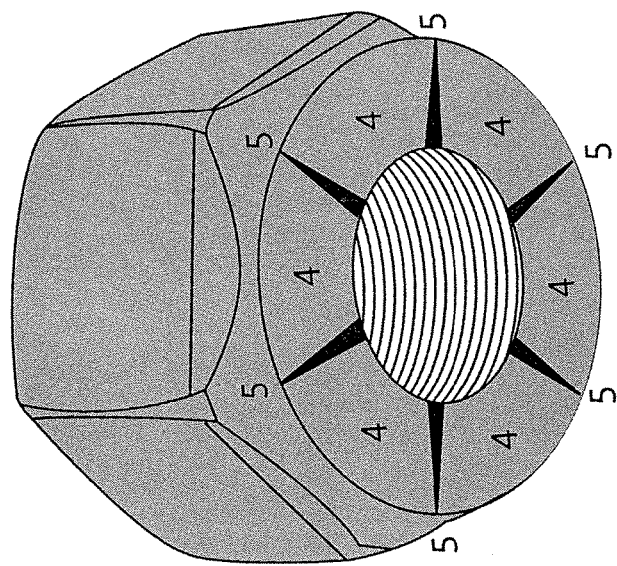

FIGS. 4A-4C illustrate a version of the one-piece, self-locking nut having slotted crush-locking lips. The outer diameter of the bolt it is to be threaded on is indicated by numeral "1." The inner diameter of the nut is indicated by numeral "2," and the difference in diameters being the thread pitch is indicated by numeral "3." The lands of the crush-locking lips are indicated by numeral "4," and the slots in between lands are indicated by numeral "5." The internal relief cut is indicated by numeral "6." The nut body height is indicated by numeral "7." FIG. 4A shows an external perspective view of the forward face of the nut, FIG. 4B shows a sectional view before torqueing, and FIG. 4C shows a sectional view after torqueing. The crush-locking lips may be formed in a star-shaped configuration with six or twelve points to align with the torque edges and/or sides of the typical hex nut. The material and design of the crush-locking lips may change, including shape, height, size, number and shape of relief cuts may vary depending on intended specific application.

Figures 5A, 5B:
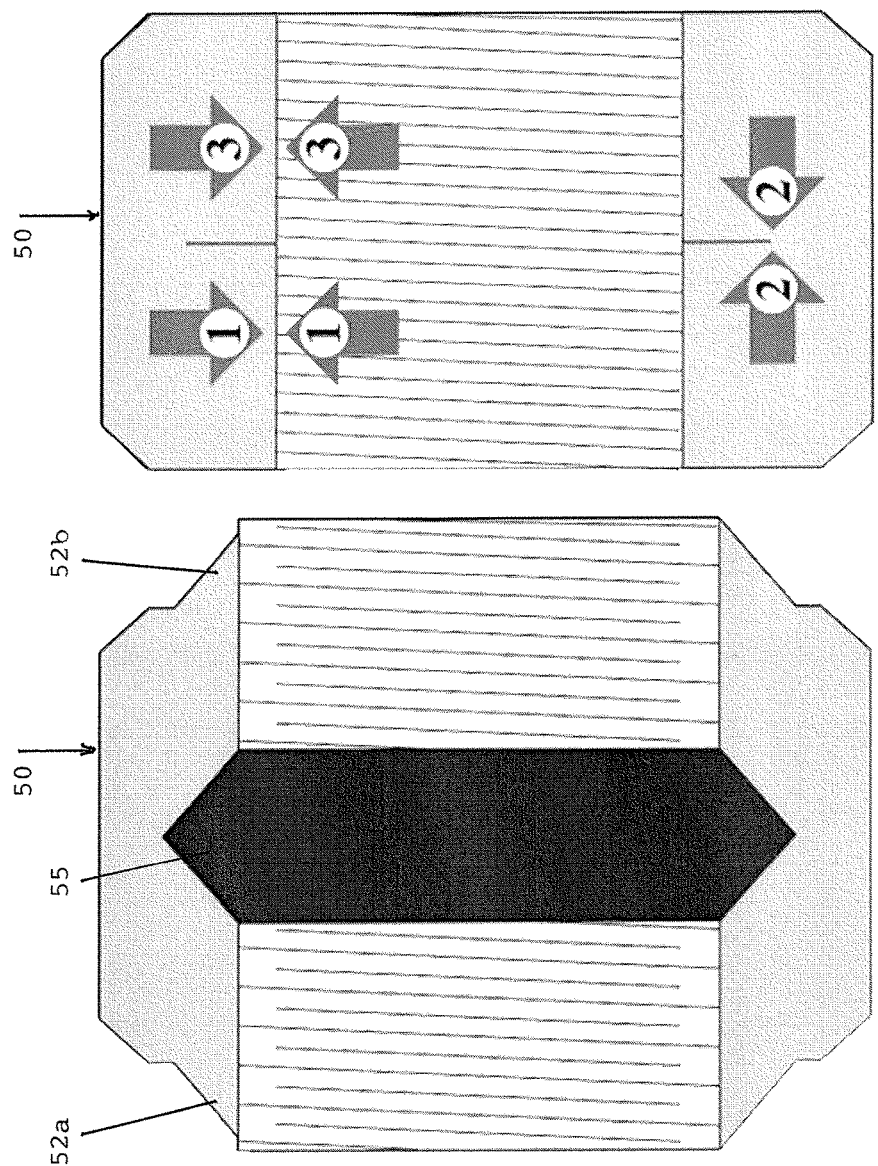
FIGS. 5A-5B illustrate a one-piece, self-locking nut having two-sided crush locking lips according to some implementations of the present disclosure.

FIGS. 5A-5B illustrate a version of the one-piece, self-locking nut having two-sided crush-locking lips. FIG. 5A shows the nut 50 before torqueing, and FIG. 5B shows it after torqueing. Both ends of the nut have self-equalizing locking lips 52a, 52b which share one inner relief cut 55. Torqueing the nut on both ends is self-balancing. Once torqued to specification, the self-locking lips are forced, when the material yields, up into the nut and bolt threads for first direction-locking. Threading in contact on the other side of the bolt shaft provides second direction-locking, thus double-locking. This version may also be formed with standard manufacturing techniques and quickly installs using conventional tools and is easily adaptable to specific applications.

FIGS. 6A-6B illustrate a version of the one-piece, self-locking nut having equalized two-sided crush-locking lips. FIG. 6A shows the nut before torqueing, and FIG. 6B shows it after torqueing. Both ends of the nut have self-equalizing locking lips 62a, 62b, each with its respective inner relief cut 65a, 65b. In effect, it is two self-locking nuts combined in a single nut.

Figures 7A, 7B:
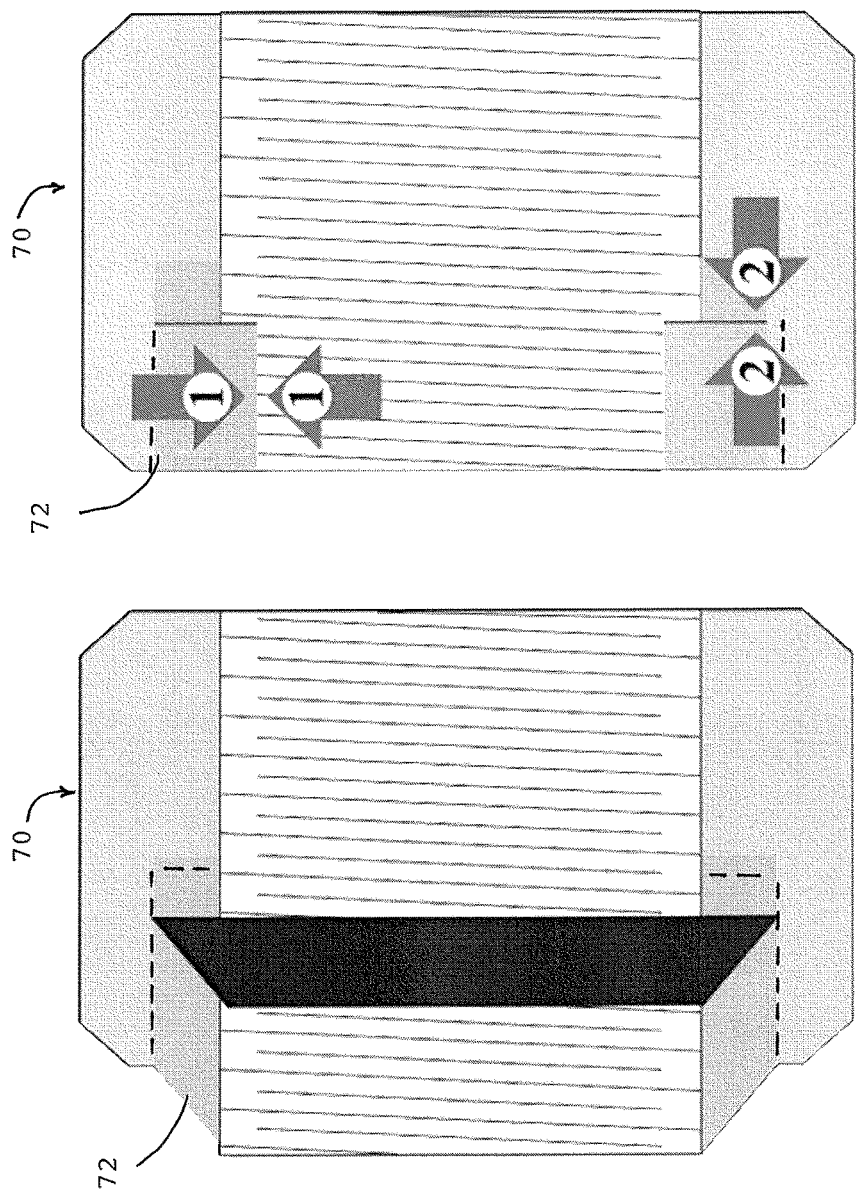
FIGS. 7A-7B illustrate a one-piece, self-locking nut having crush-locking lips made of different material than the nut body according to some implementations of the present disclosure.

FIGS. 7A-7B illustrate a version of the one-piece, self-locking nut having crush-locking lips made of different material than the nut body. FIG. 7A shows the nut before torqueing, and FIG. 7B shows it after torqueing. The nut body 70 may be made of a high strength material such as steel, while the crush-locking lips 72 may be made of a more readily deformable or ductile metal for more complete locking strength such as brass, for example.

Figure 8B:
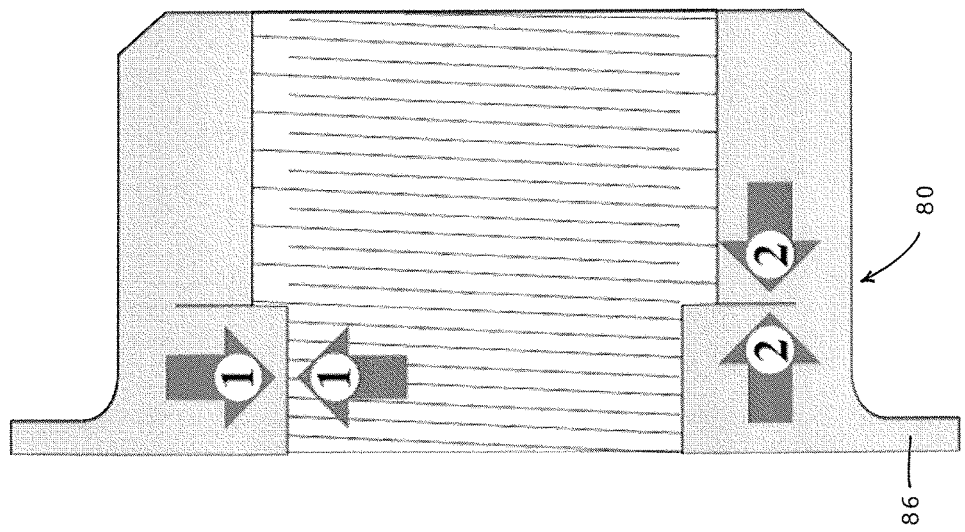
FIGS. 8A-8B illustrate a one-piece, self-locking nut having flanged crush locking lips according to some implementations of the present disclosure.
Figure 8A:
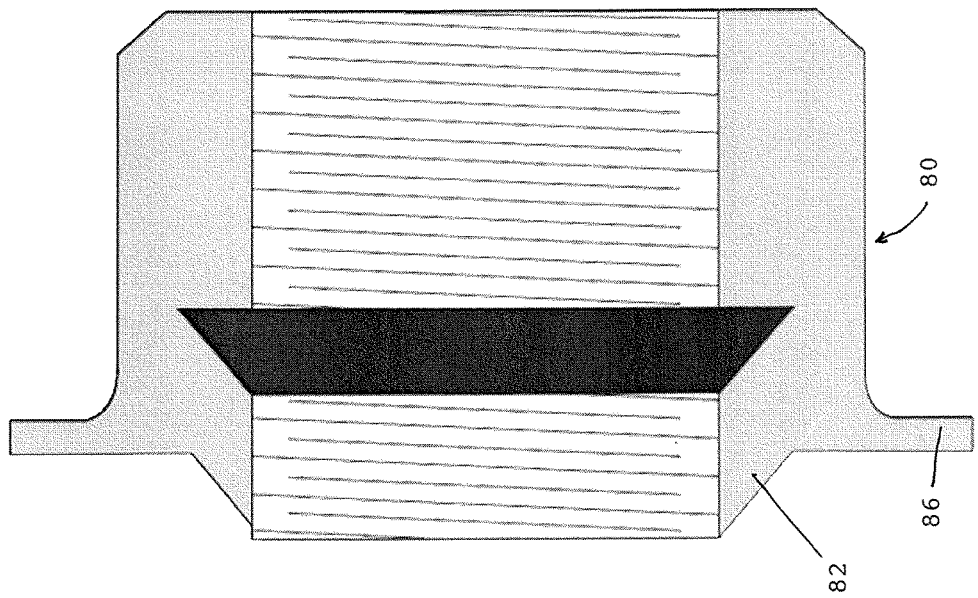

FIGS. 8A-8B illustrate a version of the one-piece, self-locking nut having flanged crush-locking lips. FIG. 8A shows the nut before torqueing, and FIG. 8B shows it after torqueing. The self-locking nut body 80 may be formed with crush-locking lips 82 and built-in flange washer 86. The flange washer may also be provided in the two-sided self-locking and two-sided combined versions.

Figure 9A:
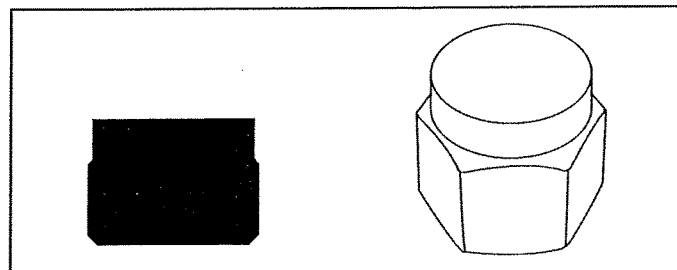
FIGS. 9A-9E illustrate an example of the stages of manufacturing a one-piece, self-locking nut according to some implementations of the present disclosure.
Figure 9B:
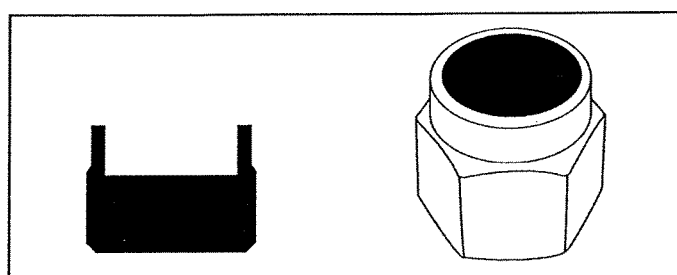
Figure 9C:
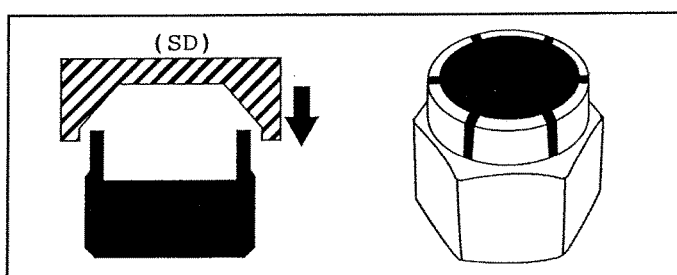
Figure 9D:
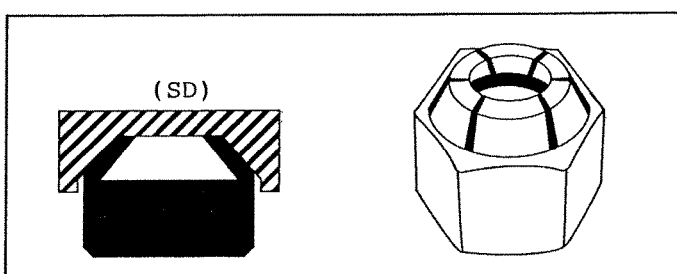
Figure 9E:
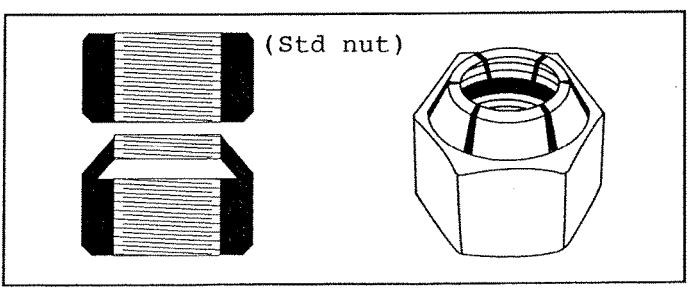

FIGS. 9A-9E illustrate an example of the stages of manufacturing a one-piece, self-locking nut. In FIG. 9A, manufacture starts with a formed (raw) "castle nut" as a base (left side of the figure shows a side cut-away view, and the right side shows a ¾ perspective view). The castle nut is made of solid metal material with no center hole or threads. In FIG. 9B, an inner relief cut (IRC) is drilled or cut into the top of castle nut to form a centered hole. The depth of the hole is determined by the selected external depth of the self-locking lips (SLL) to be formed, and the diameter of the hole is determined by the intended SLL thickness. In FIG. 9C, the SLL is formed by crimping the sides surrounding the hole with a shaping die (SD). In FIG. 9D, the SLL is shown crimped in position. In FIG. 9E, the self-locking nut hole is drilled and tapped in a similar manner as a standard nut ("Std Nut" shown for comparison in the upper part of the left side of the figure).

Figure 10A:
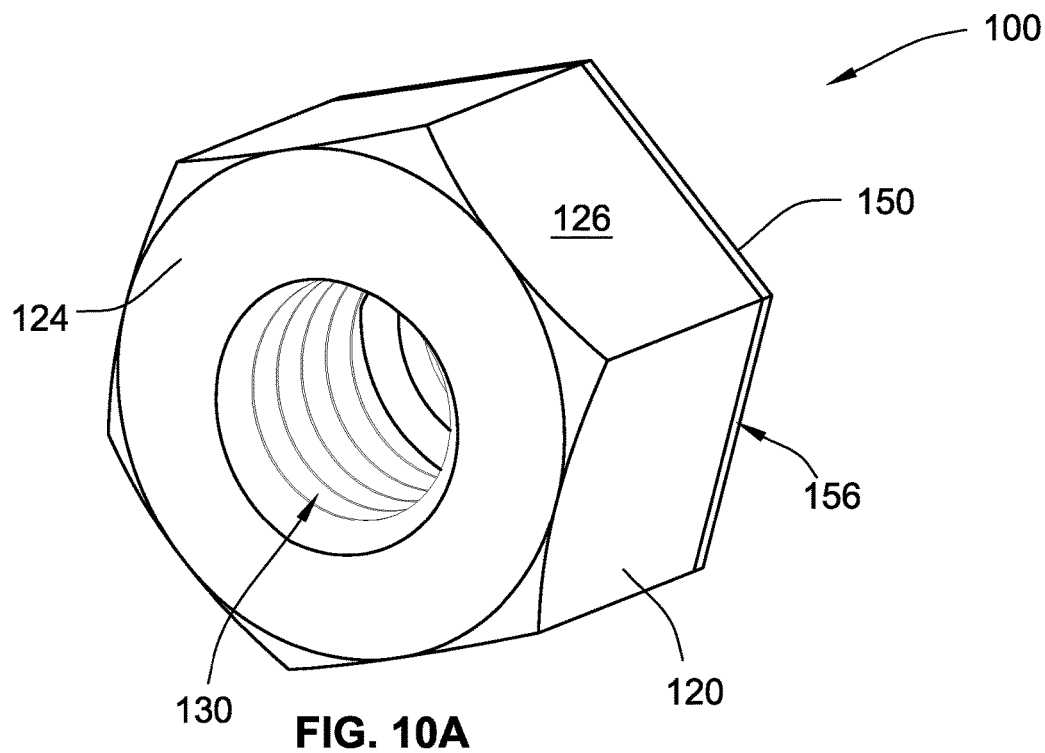
FIG. 10A is a rear perspective view of a self-locking nut according to some implementations of the present disclosure.
Figure 10B:
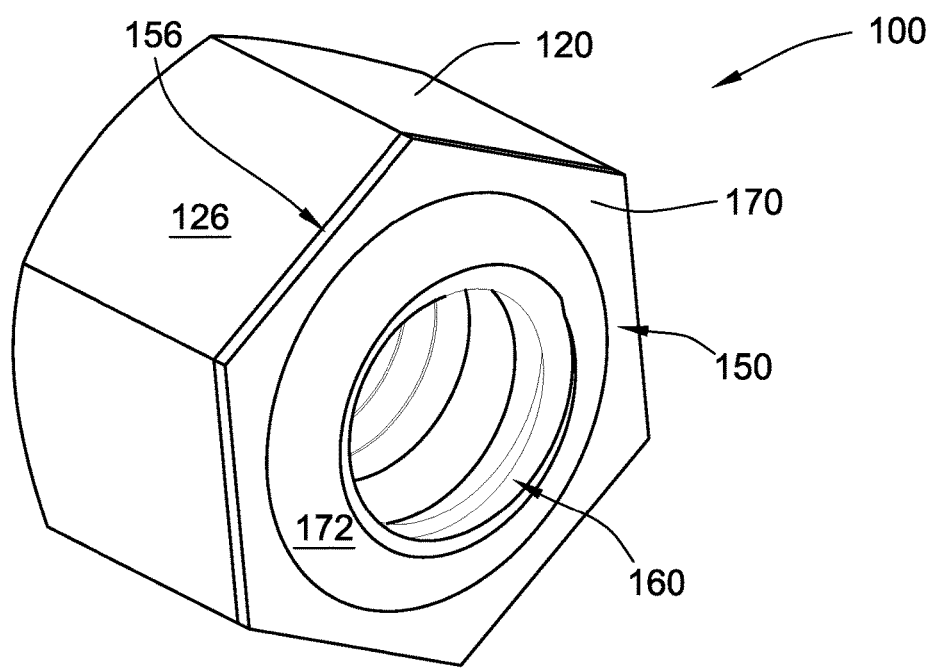
FIG. 10B is a front perspective view of the self-locking nut of FIG. 10A.

Referring generally to FIGS. 10A-10I, a self-locking nut 100 includes a main-nut body 120 and a deformable-nut body 150. The self-locking nut 100 can also be referred to as a one-piece Dynamic Inner Relief Cut ("DRIC") nut. According to some implementations of the present disclosure, the self-locking nut 100 can have a height (when the main-nut body 120 is assembled together with the deformable-nut body 150 as shown in FIGS. 10A and 10B) that is about the same as a standard nut (e.g., between about 0.2 inches and about 1 inch, about 0.2 inches, about 0.25 inches, about 0.32 inches, about 0.43 inches, about 0.85 inches, or any other height, etc.). The self-locking nut 100 can be made from one or more materials, such as, for example, brass, steel, stainless steel (e.g., type 304 stainless steel, grade 2, super alloy), titanium, plastic, nylon, etc. The main-nut body 120 and the deformable-nut body 150 are made from the same material (e.g., steel). Alternatively, the main-nut body 120 is made from a first material have a first set of properties and the deformable-nut body 150 is made from a second material have a second set of properties that is different than the first set of properties. For example, in such alternatives, the second material may be relatively more ductile than the first material.

According to some implementations of the present disclosure, the height of the main-nut body 120 can range from 10% of to 50 times a standard (e.g., ASTM or SAE) nut-body height and the height of the deformable-nut body 150 can range from 0.5 turns of a thread to 95% of the height of the main-nut body 120. The sizes of the main-nut body 120 and the deformable-nut body 150 can be selected for a specific application based on the desired installation torque, removal torque, clamping force, and vibration resistance. For example, for a standard (e.g., ASTM A563)¼ inch-20 thread per inch nut, where the standard height is approx. 0.21875 inches, the height of the main-nut body according to some embodiments of the invention can be from 0.021875 inches to 11 inches high and the height of the deformable-nut body can range from 0.5 threads (0.025 inches) to 209 threads (10.45 inches). Similarly, the thickness of the outer flange 170 can range from about 0.0079 inches to over 10.45 inches depending on the desired clamping force of the application.

The main-nut body 120 has a front surface 122 (FIG. 10D), an opposing back surface 124 (FIGS. 10A and 10D), an outer surface 126 (FIGS. 10A-10E), an interior threaded bore 130 (FIGS. 10A, 10C-10E), and a recess 140 (FIGS.

10C-10E). The outer surface 126 of the main-nut body 120 is configured to be engaged by a tool (not shown), such as, for example, a torque wrench, to rotate the self-locking nut 100 on a threaded bolt 200 (shown in FIGS. 10E-10H) causing the main-nut body 120 to move axially in a direction of arrow A towards one or more objects 300a, 300b (e.g., a plate) to be secured (e.g., bolted together between a head 220 of the threaded bolt 200 and the self-locking nut 100). As shown, the outer surface 126 of the main-nut body 120 is shaped such that the main-nut body 120 has a generally hexagonal outer cross-section, but other shapes for the outer surface 126 are contemplated (e.g., square, oval, triangle, rectangle, polygon, etc.) such that the tool can engage the self-locking nut 100 in a non-rotational fashion (e.g., the tool can cause the self-locking nut 100 to rotate relative to the threaded bolt 200).

Figure 10C:
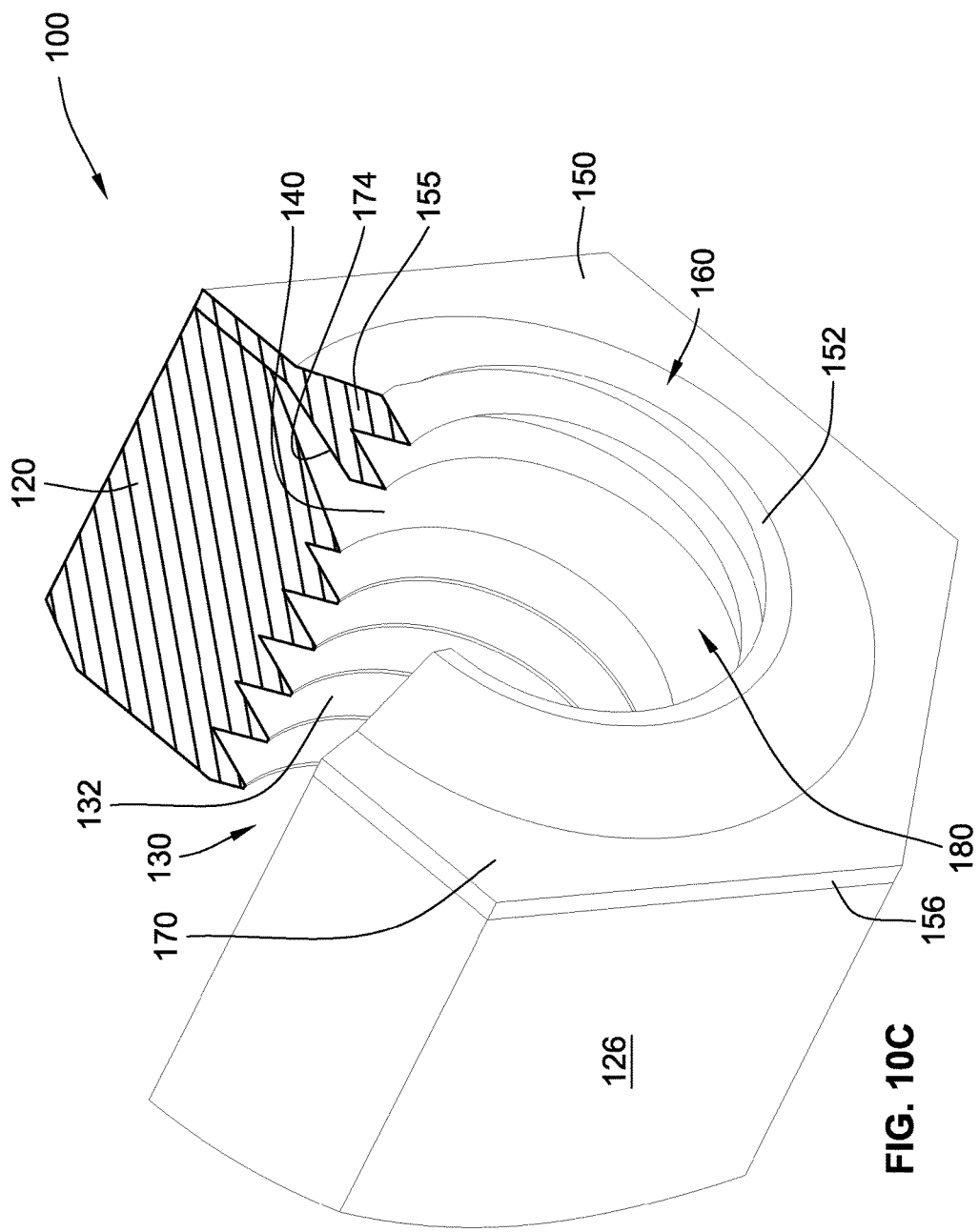
FIG. 10C is a partial cross-sectional front perspective view of the self-locking nut of FIG. 10A.
Figure 10D:
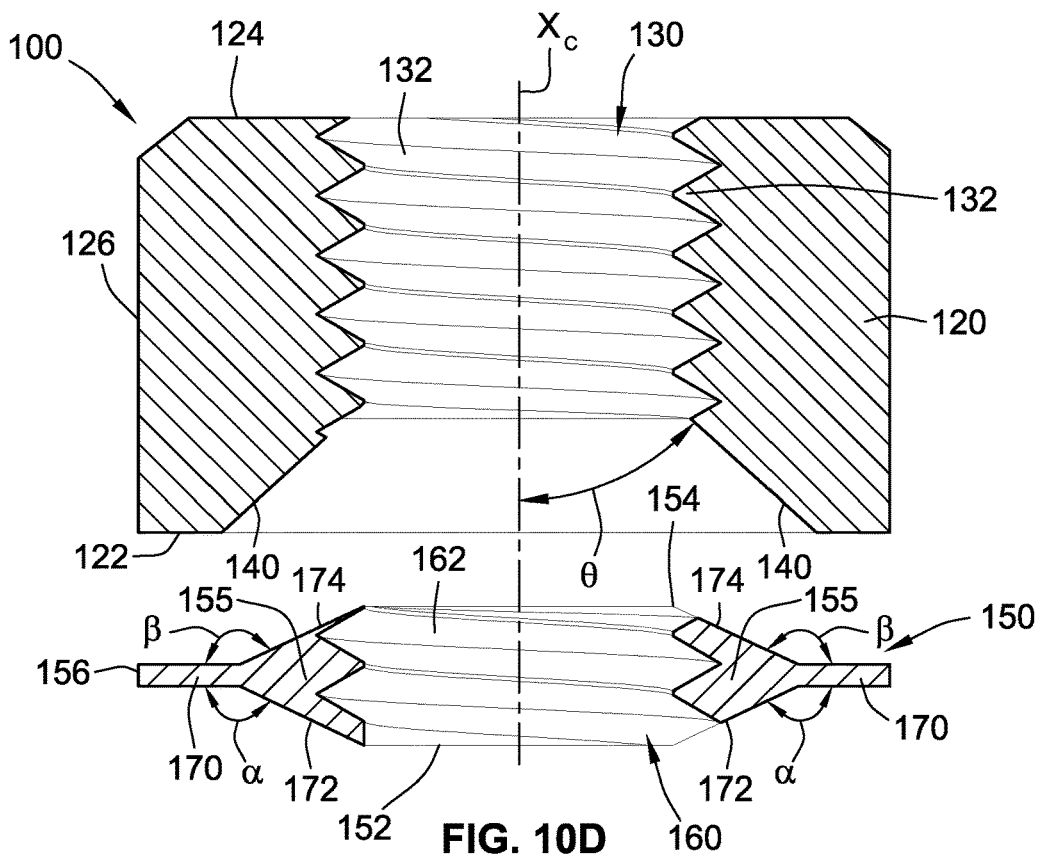
FIG. 10D is an exploded front cross-sectional view of the self-locking nut of FIG. 10A.
Figure 10E:
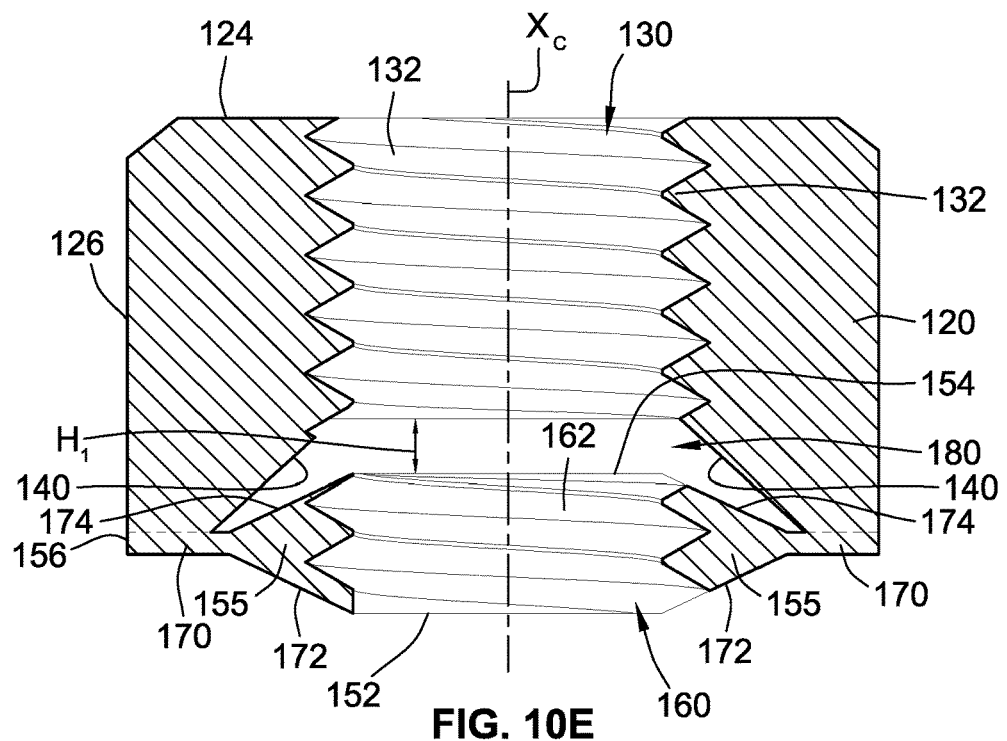
FIG. 10E is an assembled front cross-sectional view of the self-locking nut of FIG. 10A.

The interior threaded bore 130 (FIGS. 10A, 10C-10E) of the main-nut body 120 forms a plurality of turns of an internal thread 132 (FIGS. 10C-10E) therein. As best shown in FIGS. 10D and 10E, the interior threaded bore 130 forms about five complete turns of the internal thread 132 therein. According to some implementations of the present disclosure, the number of threads in the main-nut body 120 can be a function of the thread pitch and the height of the main-nut body 120 (e.g., a one inch standard eight threads-per-inch nut is about 0.859 inches high and includes 6.875 threads). According to some implementations of the present disclosure, the interior threaded bore 130 forms between about 3.25 turns and about eight turns of the internal thread 132 therein. In some implementations, the interior threaded bore 130 forms at least two complete turns of the internal thread 132 therein. In some implementations, the interior threaded bore 130 forms at least three complete turns of the internal thread 132 therein. In some implementations, the interior threaded bore 130 forms at least four complete turns of the internal thread 132 therein. In some implementations, the interior threaded bore 130 forms at least five complete turns of the internal thread 132 therein. In some implementations, depending on the application for the self-locking nut 100, the number of turns of the internal thread 132 can vary between about two turns and about four hundred turns of the internal thread 132 therein. In some such implementations, the more torque required for an application requires more turns of the internal thread 132.

The recess 140 (FIGS. 10C-10E) is in the front surface 122 (FIG. 10D) and extends into the main-nut body 120 towards the opposing back surface 124 of the main-nut body 120. As best shown in FIG. 10C, the recess 140 is an inwardly tapered recess that is annular. As shown in FIG. 10D, the recess 140 is tapered with respect to a central axis $X_c$ of the self-locking nut 100 at an angle, θ, of about 45 degrees. Alternatively, the recess 140 can tapered with respect to the central axis $X_c$ of the self-locking nut 100 at an angle, θ, which is between about 0 degrees and about 90 degrees, more preferably, the recess 140 is tapered with respect to the central axis $X_c$ of the self-locking nut 100 at the angle, θ, which is between about 30 degrees and about 75 degrees. The recess 140 has a height that is about twenty-five percent of the height of a standard nut (e.g., between about 0.05 inches and about 0.25 inches, about 0.05 inches, about 0.07 inches, about 0.08 inches, about 0.09 inches, about 0.1 inches, about 0.25 inches, etc.). In some implementations, the recess 140 has a height that is between about one percent and about twenty-five percent of a total height of the main-nut body 120 (e.g., about one percent, about two percent, about five percent, about ten percent, about twenty percent, etc.).

The deformable-nut body 150 has a central body portion 155 (FIGS. 10D and 10E) and an outer flange 170 (FIGS. 10B-10E). The central body portion 155 defines an interior threaded bore 160 (FIGS. 10B-10E) of the deformable-nut body 150. The deformable-nut body 150 has a front surface 152 (FIGS. 10C-10E), an opposing back surface 154 (FIG. 10D), an outer surface 156 (FIGS. 10C-10E), an inclined front face 172 (FIG. 10D), and an inclined rear face 174 (FIG. 10D). The central body portion 155 is generally defined as the portion of the deformable-nut body 150 that is between the outer flange 170 and the interior threaded bore 160 and between the inclined front face 172 and the inclined rear face 174. As described in further detail below, the central body portion 155 deforms and/or plasticizes during installation of the self-locking nut 100. According to some implementations of the present disclosure, a lubricant (e.g., oils, WD40, Teflon, etc.) can be used between the self-locking nut 100 and objects 300a, 300b (see FIGS. 10E-H) to be bolted together to enable the central body portion 155 to rotate relative to the objects 300a, 300b and increase the clamping force and facilitate the deformation or plasticization of the central body portion 155 in the recess 140 of main-nut body 120.

In some implementations, the deformable-nut body 150 has a general "flying saucer" shape that is formed symmetrically about a transverse plane. As best shown in FIG. 10D, the inclined front face 172 and the inclined rear face 174 are both at angles of α and β, respectively, relative to horizontal and/or relative to the outer flange 170. As shown, the angles α and β are each about one hundred and fifty degrees. Alternatively, in some implementations, the angles α and β can be any angle between about ninety degrees and about one hundred and eighty degrees (e.g., about 90 degrees, about 100 degrees, about 110 degrees, about 120 degrees, about 130 degrees, about 140 degrees, about 150 degrees, about 160 degrees, about 170 degrees, about 180 degrees, etc.). More preferably, each of the angles α and β is between about one hundred degrees and about one hundred and seventy degrees. While the angles α and β are shown as being the same, the angles α and β can different. For example, the angle α can be about 130 degrees and the angle β can be about 160 degrees. Any combination of different angles α and β is contemplated. In some alternative implementations described further below, the angles α and β can be any angle between about ninety degrees and about two hundred and seventy degrees.

Alternatively to the deformable-nut body 150 having a general "flying saucer" shape formed by the inclined front face 172 and the inclined rear face 174 being at angles α and β between ninety degrees and one hundred and eighty degrees, the deformable-nut body 150 can have an inverted central body portion (not shown) that is inverted on the front face and/or inverted on the rear face. In such alternative implementations, the angles α and β are greater than one hundred and eighty degrees. For example, a deformable nut body can have an inverted front face (not shown) and an inverted rear face (not shown) at angles α and β between about one hundred and eighty-one degrees and about two hundred and five degrees. According to some such implementations where the deformable-nut body is inverted, the recess 140 of the main-nut body 120 can be altered from (i) extending into the main-nut body 120 towards the opposing back surface 124 of the main-nut body 120 to (ii) extending out of the main-nut body 120 away from the opposing back surface 124 of the main-nut body 120 (e.g., an outwardly tapered recess).

According to some implementations of the present disclosure, the deformable-nut body 150 and/or the central body portion 155 has a height that is about one-third the height of a standard nut (e.g., between about 0.07 inches and about 0.33 inches, about 0.066 inches, about 0.08 inches, about 0.11 inches, about 0.15 inches, about 0.33 inches, etc.). In some implementations, the height of the central body portion 155 can be in the range from about one-half of the height of a single thread to about 95% of the height of the main-nut body 120. In some implementations, the deformable-nut body 150 and/or the central body portion 155 has a height that is between about one percent and about ninety-five percent of a total height of the main-nut body 120 (e.g., about one percent, about two percent, about five percent, about ten percent, about twenty percent, about twenty-five percent, about thirty percent, about thirty-five percent, about forty percent, about forty-five percent, about ninety-five percent, etc.). More preferably, the deformable-nut body 150 and/or the central body portion 155 has a height that is between about five percent and about thirty-five percent of the total height of the main-nut body 120. Any combination of different heights for the deformable-nut body 150 and the main-nut body 120 is contemplated.

The front surface 152 of the deformable-nut body 150 is the forward most surface of the self-locking nut 100 that is positioned to engage the objects 300a, 300b (see FIGS. 10E-H) to be bolted together (e.g., between the bolt head 220 and the self-locking nut 100), which limits the axial movement of the deformable-nut body 150 during installation of the self-locking nut 100.

The outer surface 156 of the deformable-nut body 150 is configured to be engaged by the tool (not shown), in the same fashion as the outer surface 126. As shown, the outer surface 156 of the deformable-nut body 150 is shaped such that the deformable-nut body 150 has a generally hexagonal outer cross-section, but other shapes for the outer surface 156 are contemplated such that the tool can engage the self-locking nut 100 in a non-rotational fashion (e.g., the tool can cause the self-locking nut 100 to rotate relative to the threaded bolt 200).

Figure 15A:
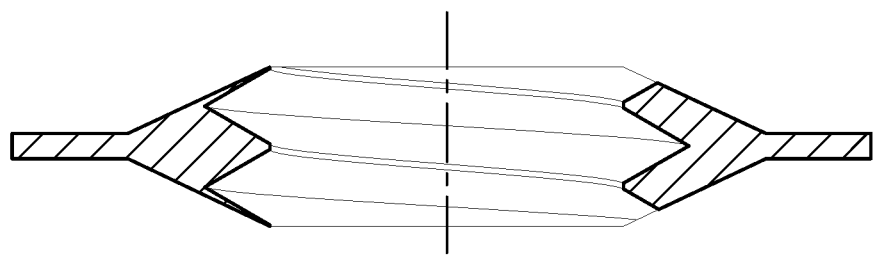
FIG. 15A is a front cross-sectional view of a deformable-nut body according to some implementations of the present disclosure.
Figure 15B:
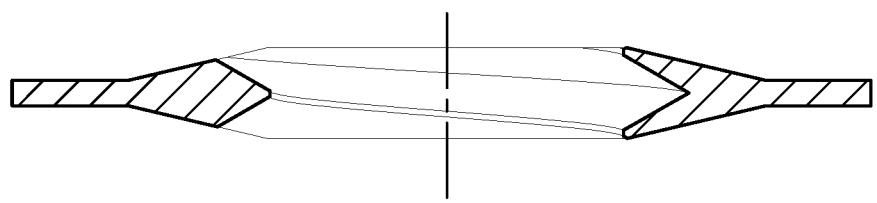
FIG. 15B is a front cross-sectional view of a deformable-nut body according to some implementations of the present disclosure.

The interior threaded bore 160 of the deformable-nut body 150 forms a plurality of turns of an internal thread 162 therein. As shown, the internal thread 162 of the deformable-nut body 150 has the same pitch and depth as the internal thread 132 of the main-nut body 120 such that the self-locking nut 100 can be readily threaded onto (i.e., screwed on) the threaded bolt 200. Alternatively, the internal thread 162 of the deformable-nut body 150 can have a pitch and/or depth that are different than the pitch and the depth as the internal thread 132 of the main-nut body 120 (e.g., the internal thread 162 of the deformable-nut body 150 is not timed with and/or not aligned with the internal thread 132 of the main-nut body 120). As best shown in FIGS. 10C-10E, the interior threaded bore 160 forms about two complete turns of the internal thread 162 therein. Alternatively, the interior threaded bore 160 forms between about 0.125 turns and about 200 turns of the internal thread 162 therein. More preferably, the interior threaded bore 160 forms between about 0.5 turns and about 4 turns of the internal thread 162 therein. In some implementations, the interior threaded bore 160 forms less than three complete turns of the internal thread 162 therein (see for example FIG. 10D). In some implementations, the interior threaded bore 160 forms less than two complete turns of the internal thread 162 therein (see for example FIG. 15A). In some implementations, the interior threaded bore 160 forms less than one complete turn of the internal thread 162 therein (see for example FIG. 15B).

In some implementations, the number of turns of the internal thread 132 of the interior threaded bore 130 of the main-nut body 120 and the number of turns of the internal thread 162 of the interior threaded bore 160 of the deformable-nut body 150 is expressed as a ratio of 2:1, 3:1, or 4:1. In some such examples when the ratio is 2:1, if the internal thread 132 of the main-nut body 120 has four threads, the internal thread 162 of the deformable-nut body 150 would have two threads. Similarly, when the ratio is 3:1, if the internal thread 132 of the main-nut body 120 has six threads, the internal thread 162 of the deformable-nut body 150 would have two threads.

The outer flange 170 of the deformable-nut body 150 is relatively thinner than the central body portion 155 of the deformable-nut body 150 such that the outer flange 170 is able to act as a pivot and/or fulcrum point for the central body portion 155 to deform/plasticize about during installation of the self-locking nut 100 on, for example, a threaded bolt shaft 240 of the threaded bolt 200. In some implementations, the outer flange 170 of the deformable-nut body 150 has a first elastic modulus and the rest of the deformable-nut body 150 has a second elastic modulus that is greater than the first elastic modulus. In some implementations, the outer flange 170 has a thickness between about 0.0004 inches and about 12 inches. More preferably, the outer flange 170 has a thickness between about 0.002 inches and about 0.5 inches. In some implementation, the outer flange 170 has a thickness that is between about 10 percent to about 80 percent of a maximum/total height of the deformable-nut body 150. More preferably, the outer flange 170 has a thickness that is between about 15 percent to about 30 percent of the maximum/total height of the deformable-nut body 150.

As best shown in FIGS. 10B and 10C, the outer flange 170 extends outwardly from the central body portion 155 such that the entirety of the outer surface 156 of the deformable-nut body 150 is co-planar with the entirety of the outer surface 126 of the main-nut body 120 (i.e., about the entire circumference of the self-locking nut 100). Alternatively, the outer flange 170 extends outwardly from the central body portion 155 such that only a portion of the outer surface 156 of the deformable-nut body 150 is co-planar with the outer surface 126 of the main-nut body 120. For example, if the outer surface 156 has an outer circular cross-section with a diameter equal to a minimum width of the main-nut body 120, then only tangential portions of the outer surface 156 of the deformable-nut body 150 would be co-planar with the outer surface 126 of the main-nut body 120. In another alternative, the outer flange 170 extends outwardly such that none of the outer surface 156 of the deformable-nut body 150 is co-planar with the outer surface 126 of the main-nut body 120 (e.g., when a maximum outer diameter of the deformable-nut body 150 is less than a minimum outer diameter of the main-nut body 120). In some such implementations where none of the outer surface 156 is co-planar with the outer surface 126, the tool engaging the self-locking nut 100 during installation would not directly engage the deformable-nut body 150.

During assembly and/or creation of the self-locking nut 100 as best shown by a comparison of FIGS. 10D and 10E, the outer flange 170 of the deformable-nut body 150 is attached to the front surface 122 of the main-nut body 120 such that a relief space 180 (FIGS. 10C and 10E) is formed between a portion of the deformable-nut body 150 and the recess 140 of the main-nut body 120. Specifically, as best shown in FIG. 10E, the relief space 180 is formed between the recess 140 and (i) a portion of the outer flange 170, the inclined rear face 174, and the back surface 154. The relief space 180 provides an area for the deformable-nut body 150 to deform into (e.g., elastically flow via plastic deformation) during installation of the self-locking nut 100 on the threaded bolt shaft 240 of the threaded bolt 200 (as shown in FIGS. 10E-10H). In some implementations, the central body portion 155 of the deformable-nut body 150 deforms into (e.g., elastically flow via plastic deformation) the relief space 180. In some implementations, a portion of the flange 170 also deforms into (e.g., elastically flow via plastic deformation) the relief space 180. The outer flange 170 can be permanently and/or non-rotationally attached/fixed to the main-nut body 120 via welding, soldering (e.g., silver soldered), gluing, sonic-welding, etc. or any combination of attachment methods such that the deformable-nut body 150 and the main-nut body 120 cannot rotate (e.g., about the central axis $X_c$ of the self-locking nut 100) relative to each other. According to some implementations of the present disclosure, the main-nut body 120 and the deformable-nut body 150 become an integral unit (e.g., once attached together) such that rotating the main-nut body 120 (e.g., during installation of the self-locking nut 100) causes a corresponding/identical rotation of the deformable-nut body 150.

Generally, during installation of the self-locking nut 100, the amount of the relief space 180 is reduced. As best shown in FIGS. 10C and 10E, the outer flange 170 of the deformable-nut body 150 is fixed to the main-nut body 120 such that a generally cylindrical portion of the relief space 180 is established between the interior threaded bore 160 of the deformable-nut body 150 and the interior threaded bore 130 of the main-nut body 120. As best shown in the pre-installation (e.g., pre-torqueing of the self-locking nut 100 that causes deformation of the deformable-nut body 150) configuration in FIGS. 10E and 10F, the generally cylindrical portion of the relief space 180 has a first height $H_1$ prior to installation of the self-locking nut 100, for example, on the threaded bolt 200. Additionally, as shown in the fully installed configuration in FIG. 10H (bolt 200 shown) and FIG. 10I (bolt 200 removed for illustrative purposes), the generally cylindrical portion of the relief space 180 has a second height $H_2$, wherein the second height $H_2$ is less than the first height $H_1$ (e.g., the second height $H_2$ is ten percent or twenty percent or thirty percent or forty percent or fifty percent or sixty percent or seventy percent or eighty percent of the first height $H_1$; the second height $H_2$ is between about ten percent and about ninety percent of the first height $H_1$, etc.). For example, the first height $H_1$ is about one-eighth of an inch and the second height $H_2$ is about one-sixteenth of an inch. In some implementations, the second height $H_2$ has a height that is about six percent of the height of a standard nut (e.g., between about 0.01 inches and about 0.06 inches, about 0.015 inches, about 0.02 inches, about 0.025 inches, about 0.03 inches, about 0.04 inches, about 0.06 inches, etc.).

Put another way, prior to installation of the self-locking nut 100 on the threaded bolt shaft 240 (FIG. 10F), a first portion of the deformable-nut body 150 is contained in the recess 140 (FIG. 10D) of the main-nut body 120. After installation of the self-locking nut 100 on the threaded bolt shaft 240 (FIGS. 10H and 10I), a second portion of the deformable-nut body 150 is contained in the recess 140 of the main-nut body 120, wherein the second portion of the deformable-nut body 150 has a larger volume than the first portion of the deformable-nut body 150. Similarly, due to the deformation of the deformable-nut body 150 during installation, the deformable-nut body 150 has a first shape (e.g., a flying saucer-type shape) prior to installation of the self-locking nut 100 on the threaded bolt shaft 240 and a different second shape (e.g., a flattened on one-side flying saucer-type shape, such as on the front face 172) after installation of the self-locking nut 100 on the threaded bolt shaft 240.

With reference to FIGS. 10D and 10E, a method of making the self-locking nut 100 is described. As shown in FIG. 10D, the method includes providing the main-nut body 120 having the recess 140 that leads into the interior threaded bore 130 with x number of turns of the internal thread 132 therein (e.g., more than three turns, four turns, one turn, five turns, ten turns, twenty turns, etc.). The method also includes providing the deformable-nut body 150 having the central body portion 155, the outer flange 170, and the interior threaded bore 160 with y number of turns of the internal thread 162 therein (e.g., less than three turns, 2.5 turns, 2 turns, 1.75 turns, 1.5 turns, one turn, 0.5 turns, 5 turns, 10 turns, etc.). In some implementations, x is greater than y. In some implementations, a ratio of x:y is 2:1, 3:1, 4:1, 5:1, etc. As shown in FIG. 10E, these two provided pieces are then fixed together by, for example, fixing the outer flange 170 of the deformable-nut body 150 to the main-nut body 120 via welding, soldering, gluing, sonic-welding, etc. or any combination of attachment methods such that the relief space 180 (FIG. 10E) is formed between the deformable-nut body 150 and the recess 140. The deformable-nut body 150 can also be provided with the outer surface 156 that is configured to be engaged by the tool (not shown), in the same fashion as the outer surface 126. Additionally, the method includes fixing the outer flange 156 of the deformable-nut body 150 to the main-nut body 120 such that the deformable-nut body 150 cannot rotate relative to the main-nut body 120.

The above described method provides the main-nut body 120 and the deformable-nut body 150 already having the threads 132/162 therein. Alternatively, the main-nut body 120 and the deformable-nut body 150 may be provided without already having the threads 132/162 therein. For example, in such a method of making a self-locking nut, a deformable-nut body having a central body portion, an outer flange, and a non-threaded interior bore is provided. Then, a main-nut body having a recess leading into a non-threaded interior bore is provided. The outer flange of the deformable-nut body is then fixed to the main-nut body in the same or similar fashion as described above such that a relief space is formed between the deformable-nut body and the recess. With the deformable-nut body fixed to the main-nut body, the self-locking nut is then tapped (e.g., threads are cut therein). First the interior bore of the deformable-nut body is tapped such that a number of turns of an internal thread are formed therein (e.g., less than three turns of the thread, two turns, etc.) and then the interior bore of the main-nut body is tapped such that a number of turns of an internal thread are formed therein (e.g., more than three turns of the thread, five turns, six turns, etc.). Alternatively, the self-locking nut can be tapped in the opposing direction such that the interior bore of the main-nut body is tapped and then the interior bore of the deformable-nut body is tapped. In either direction of tapping, the tapping occurs with the same tool, one piece after the other.

Alternatively, the tapping of the interior bore of the deformable-nut body 150 and/or the tapping of the interior bore of the main-nut body 120 may occur at the same time with two identical tools. In yet a further alternative, the tapping of the interior bore of the deformable-nut body 150 and/or the tapping of the interior bore of the main-nut body 120 may occur with two different tools. In such an alternative implementation, the tapping can yield two threaded bores with differently pitched threads and/or differently sized threads. To aid in the installation of such a self-locking nut with different threaded bores for the deformable-nut body 150 and the main-nut body 120, the materials of the deformable-nut body 150 and the main-nut body 120 may be different (e.g., the material of the deformable-nut body 150 may be softer than the material of the main-nut body 120).

Figure 10F:
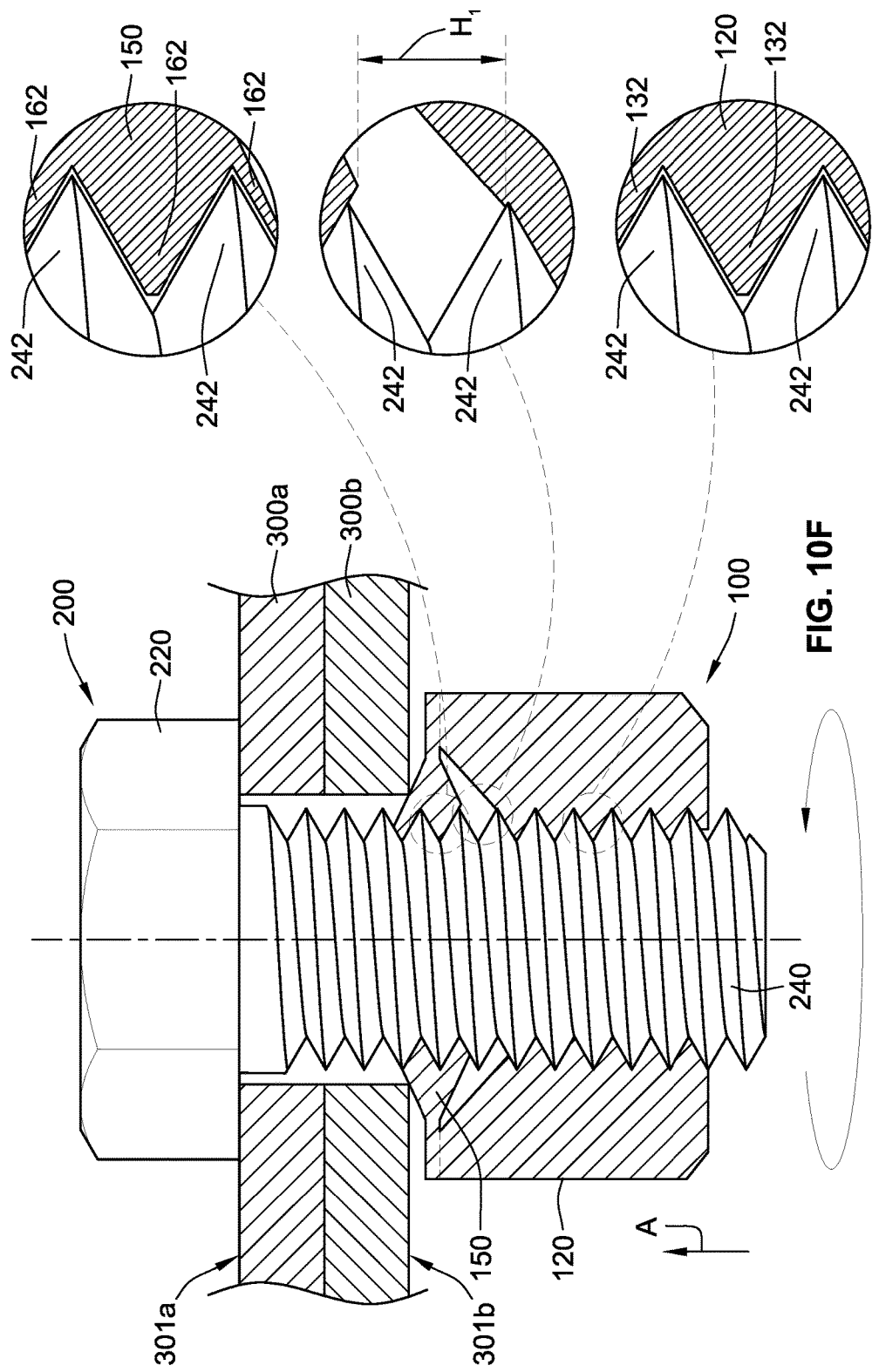
FIG. 10F is a front cross-sectional view of the self-locking nut of FIG. 10A threaded onto a threaded bolt prior to being torqued according to some implementations of the present disclosure.

Now referring to FIGS. 10E-10H, a method of permanently locking the self-locking nut 100 on the threaded bolt shaft 240 of the threaded bolt 200 is described. Initially, the threaded bolt shaft 240 is positioned through an opening in objects 300a, 300b such that a portion of the threaded bolt shaft 240 protrudes from the opening and such that the head 220 of the threaded bolt 200 abuts a surface 301a of the object 300a. Then the self-locking nut 100 is threaded onto the portion of the threaded bolt shaft 240 protruding from the opening by rotating the self-locking nut 100 in a first rotational direction (as shown in FIG. 10F as being clockwise, but could be counterclockwise in other implementations). This rotation of the self-locking nut 100 causes the self-locking nut 100 to move axially in the direction of arrow A towards a surface 301b of the object 300b and towards the head 220 of the threaded bolt 200. The self-locking nut 100 is continued to be rotated on the portion of the threaded bolt shaft 240 until the front surface 152 of the deformable-nut body 150 abuts and/or first contacts the surface 301b of the object 300b. Then with the front surface 152 of the deformable-nut body 150 abutting the surface 301b of the object 300b, a rotational torque is applied (e.g., using a torque wrench), in the first rotational direction, to the self-locking nut 100. This torqueing causes the main-nut body 120 to move axially in the direction of arrow A and further causes the deformable-nut body 150 to deform (e.g., the central body portion 155 deforms, the outer flange 170 deforms, or both). As the deformable-nut body 150 deforms, a portion of the deformable-nut body 150 (e.g., a portion of the central body portion 155, a portion of the outer flange 170, or a combination thereof) enters into the relief space 180 formed between the deformable-nut body 150 and the main-nut body 120.

Figure 10G:
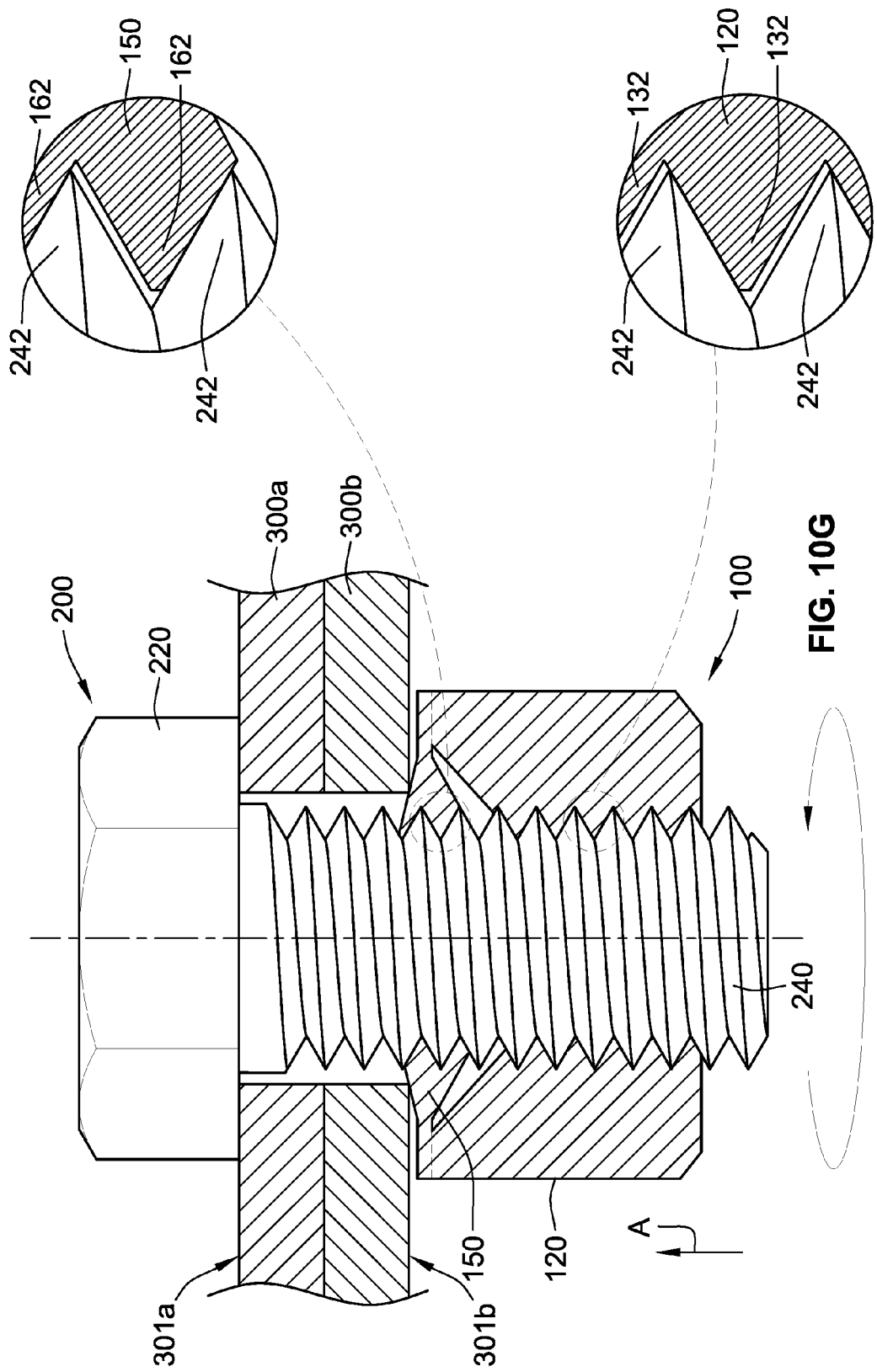
FIG. 10G is a front cross-sectional view of the self-locking nut of FIG. 10A threaded onto the threaded bolt after being partially torqued such that a deformable-nut body of the self-locking nut begins to deform.

As shown by a comparison of FIGS. 10F and 10G, the deformable-nut body 150 has started to deform and enter into the relief space 180. Further, as shown by a comparison of FIGS. 10G and 10H, the deformable-nut body 150 deformed even more with more of the deformable-nut body 150 entered into the relief space 180. In addition to the deformable-nut body 150 entering into the relief space 180, the surface 301b impedes and/or prevents the deformable-nut body 150 from moving in the direction of arrow A, which results in the front surface 152 and/or the inclined front face 172 flattening out, which can be seen by comparing FIG. 10F (prior to torqueing and not flattened) with FIG. 10H (after torqueing and flattened). More specifically, in some implementations, the inclined front face 172 flattens out, which changes angle α from about one hundred and fifty degrees to about one hundred and eighty degrees (e.g., essentially flat/co-planar with the outer flange 170 and/or horizontal).

The deformation of the deformable-nut body 150 (e.g., the deformation of the central body portion 155) during the torqueing causes the self-locking nut 100 to lock onto the threaded bolt shaft 240 of the threaded bolt 200. Specifically, as best shown in the enlarged portions of FIGS. 10E-10H, the interaction of the threads 242 of the threaded bolt shaft 240 with (1) the threads 162 of the deformable-nut body 150 and (2) the threads 132 of the main-nut body 120 causes the self-locking nut 100 to clamp onto and/or lock onto the threaded bolt shaft 240 by forming a compression zone of opposing compressive forces applied to the threads 242 of the threaded bolt shaft 240.

As shown in FIG. 10F, prior to any torqueing of the self-locking nut 100, the threads 242 of the threaded bolt shaft 240 are positioned with generally equal spacing (e.g., equal gaps) above and below the threads 242. In this configuration, minimal forces (e.g., frictional forces) hold the self-locking nut 100 on the threaded bolt 200. Once the self-locking nut 100 is torqued in the first rotational direction, because the front surface 152 of the deformable-nut body 150 cannot move in the direction of arrow A, the deformation of the deformable-nut body 150 begins (e.g., the deformation of the central body portion 155), which causes the underside of the threads 162 of the deformable-nut body 150 (e.g., the outer surface of the threads 162 with respect to the object 300b) to engage the upperside of the threads 242 of the threaded bolt shaft 240 (e.g., the inner surface of the threads 242 with respect to the object 300b). At the same time, because the main-nut body 120 can move in the direction of arrow A (e.g., due to the relief space 180), the torqueing of the self-locking nut 100 in the first rotational direction causes the main-nut body 120 and its threads 132 to move in the direction of arrow A, which causes the upperside of the threads 132 (e.g., the inner surface of the threads 132 with respect to the object 300b) to engage the lowerside of the threads 242 of the threaded bolt shaft 240 (e.g., the outer surface of the threads 242 with respect to the object 300b). The opposing engagement of the threads 242 of the threaded bolt shaft 240 creates the compression zone where the main-nut body 120 applies a force generally in the direction of arrow A and the deformable-nut body 150 applies a force generally in a direction opposite of arrow A such that the self-locking nut 100 clamps onto or locks on the threaded bolt 200. This compression zone consisting of opposing compressive forces creates permanent internal pressure which, by Newton's Third Law of physics, is resistant (e.g., fully resistant) to vibration and loosening (e.g., the resistance is limited only by the material strength of the self-locking nut 100 itself). The permanent internal pressure created results in a permanent locking feature that is different from other nut fasteners in that the self-locking nut 100 of the present disclosure does not rely on thread friction for vibration resistance. Vibration resistance is created by internal permanent pressure (pre-compression) which is reinforced by the tensile and compressive strength of the self-locking nut material.

In addition to the creation of the compression zone, the plasticizing of the deformable-nut body 150 aids in (e.g., is critical to) the creation of a permanent lock that prevents the self-locking nut 100 from rotating or backing off the threaded bolt 200. The internal pressure created by the compression zone (opposing compressive forces) becomes permanent once the deformable-nut body 120 is deformed and plasticized to a threshold degree. Specifically, after the deformable-nut body 150 deforms/plasticizes as described herein, the threads 162 of the deformable-nut body 150 remain in time with and/or aligned with the threads 132 of the main-nut body 120, and each of the threads 162 of the deformable-nut body 150 and the threads 132 of the main-nut body 120 remain in time with and/or aligned with the threads 242 of the threaded bolt 200. To illustrate this, by way of an example, after installation of the self-locking nut 100, if the main-nut body 120 were to be circumferentially cut across the affixation point of the outer flange 170 of the deformable-nut body 150 to the front surface of the main-nut body 120, both the main-nut body 120 and the deformable-nut body 150 could be freely rotated off of the threaded bolt 200, with the threads 132, 162 remaining intact (e.g., not being stripped). However, if the self-locking nut 100 remains intact (i.e., the deformable-nut body 150 is not circumferentially cut across the affixation point of the outer flange 170), once the deformable-nut body 150 has been plasticized (e.g., permanently deformed) during the installation, the internal pressure generated from the compression zone becomes permanent and cannot be released without destruction of the threads 162 of the deformable-nut body 150. To illustrate this by way of further example, a sufficient force to overcome the internal pressure, accomplished by applying a reverse direction torque to the main-nut body 120, would result in the stripping of the threads 162 of the deformable nut body 150 (e.g., destruction of the self-locking nut 100) because the main-nut body 120 can withstand the higher pressure due to its increased number of threads 132 relative to the fewer number of threads 162 of the deformable-nut body 150. That is the pressure is beyond the capacity of the deformable-nut body 150, which has a fewer number of threads relative the main-nut body 120. The permanent internal pressure is released when forcibly removing the self-locking nut 100 (e.g., by applying sufficient reverse torque) only when the threads 162 of the deformable-nut body 150 strip (e.g., the material of the threads 162 fails).

As described above, once the deformable-nut body 150 plasticizes, the internal pressure from the compression zone becomes permanent, and cannot be released without destruction of the threads 162 of the deformable-nut body 150. The deformable-nut body 150 threads 162 strip because they require less pressure to strip than to overcome the compressive pressures of the compression zone. Stated another way, the threads 162 of the deformable-nut body 150 will strip before the permanent internal pressure is released. In order for the self-locking nut 100 to be removed by vibration, the vibration force would have to be of such a degree as to cause failure of the material, i.e. overcome the strength of the material. The self-locking nut 100 is vibration-proof up to the limit of the strength of the self-locking nut material itself. The only way the self-locking nut 100 could vibrate loose is if the material strength fails, but then the threads 162 of the deformable-nut body 150 would be stripped and the self-locking nut 100 would not be able to reverse out.

As described above, to remove the self-locking nut 100 from a bolt once installed, a significant amount of force would need to be applied such that the threads 132 and/or the threads 162 would be stripped during the attempted removal of the self-locking nut 100. Further, after the deformable-nut body 150 deforms/plasticizes as described herein, the pressure (in addition to the compressive forces described above) due to the extra material pressed up against the threads 242 of the threaded bolt 200 results in additional (e.g., radial and/or axial) compressive forces plus a relatively increased amount of friction between the threaded bolt 200 and the self-locking nut 100 which further prevents movement of the self-locking nut 100.

The combination of the compression zone permanent internal pressure consisting of opposing compressive forces, plus the additional locking forces created by the applied torque and deformation of the deformable-nut-body 150, permits the self-locking nut 100 to achieve a superior holding force (e.g., as compared with prior nut fasteners), which can be considered a permanent lock, which retains its clamp load pressure even if the threaded bolt 200 with the installed self-locking nut 100 is cut into quarters axially or profile cut.

In some implementations, installation of the self-locking nut 100 on the threaded bolt 200 against the object 300b (e.g., with the correct amount of torque applied), results in a majority or most of the space between the threads 162 of the deformable-nut body 150 and the threads 242 of the threaded bolt 200 being removed due to the deformation of the deformable-nut body 150. In such implementations, the deformation changes at least a portion of the self-locking nut 100 and at least a portion of the threaded bolt 200 into almost one piece of material. Such a self-locking nut 100 has a relatively higher strength-to-weight ratio than a conventional nut. Additionally, such a self-locking nut 100 has a relatively higher/better resistance to vibration than a conventional nut, as the self-locking nut 100 is almost vibration proof or is vibration proof.

The self-locking nuts of the present disclosure can be used to replace rivets and welding with an improved/superior faster. The self-locking nuts of the present disclosure are theft-resistant when installed (e.g., on the threaded bolt 200), and thus, are useful in many security applications. The locking strength of the self-locking nut 100 can be altered by modifying the depth and position of the recess 140 and/or the profile of the back surface 154 of the deformable-nut body 150 and/or the material(s) used to form the self-locking nut 100. The self-locking nut 100 weighs about the same as a conventional nut (e.g., between about 0.03 pounds (for a ½ inch nut) and about 0.3 pounds (for a 1 inch nut)). The self-locking nut 100 can be faster to install than one and two-piece conventional nuts. Further, the self-locking nut 100 is threaded such that it threads onto a bolt with no or very little resistance just like a conventional nut and uses relatively less material than conventional two-piece locking nuts.

The self-locking nuts of the present disclosure are shown and described as having a variety of configurations and variety of numbers of turns of internal threads. Various other implementations are contemplated, such as, for example, the implementations described in the table below:

| Self-Locking Nut Implementations | Number of Turns of Internal Thread of Interior Threaded Bore of Main-Nut Body | Number of Turns of Internal Thread of Interior Threaded Bore of Deformable-Nut Body |
|---|---|---|
| Nut #1 | 1.75 | 1 |
| Nut #2 | 2.0 | 1 |
| Nut #3 | 2.25 | 1 |
| Nut #4 | 2.5 | 1 |
| Nut #5 | 2.75 | 1 |
| Nut #6 | 3.0 | 1 |
| Nut #7 | 3.75 | 1 |
| Nut #8 | 4.0 | 1 |
| Nut #9 | 3.5 | 2 |
| Nut #10 | 4.0 | 2 |
| Nut #11 | 4.5 | 2 |
| Nut #12 | 5.0 | 2 |
| Nut #13 | 5.5 | 2 |
| Nut #14 | 6.0 | 2 |
| Nut #15 | 7.5 | 2 |
| Nut #16 | 8.0 | 2 |
| Nut #17 | 7.0 | 4 |
| Nut #18 | 8.0 | 4 |
| Nut #19 | 9.0 | 4 |

| Self-Locking Nut Implementations | Number of Turns of Internal Thread of Interior Threaded Bore of Main-Nut Body | Number of Turns of Internal Thread of Interior Threaded Bore of Deformable-Nut Body |
| --- | --- | --- |
| Nut #20 | 10.0 | 4 |
| Nut #21 | 11.0 | 4 |
| Nut #22 | 12.0 | 4 |
| Nut #23 | 15.0 | 4 |
| Nut #24 | 16.0 | 4 |

In some implementations, a self-locking nut of the present disclosure includes a main-nut body with an interior threaded bore having about 3.5 turns of an internal thread therein and a deformable-nut body with an interior threaded bore having about two turns of an internal thread therein. In some other implementations, a self-locking nut of the present disclosure includes a main-nut body with an interior threaded bore having about 3.5 turns of an internal thread therein and a deformable-nut body with an interior threaded bore having about two turns of an internal thread therein.

The self-locking nuts of the preset disclosure are shown and described as having a deformable-nut body 150 with an interior threaded bore 160; however, in some alternative implementations, the deformable-nut body 150 does not have an interior threaded bore, but rather has a non-threaded or smooth interior bore (not shown). In such implementations, during installation, the deformable-nut body 150 would still deform.

In accordance with some implementations of the present disclosure, the height of the main-nut body 120 ranges from about ten percent to about fifty times the height of a standard nut height and the height of the deformable-nut body 150 ranges from about 0.5 turns of a thread to about ninety-five percent of the height of the main-nut body 120. For example, in some such implementations, for a standard (e.g., ASTM A563)¼ inch-20 thread per inch nut, where the standard height is approx. 0.21875 inches, the height of the main-nut body 120 is between about 0.021875 inches and about 11 inches high and the height of the deformable-nut body 150 is between about 0.5 threads (about 0.025 inches) and about 209 threads (about 10.45 inches). Similarly, a thickness of the outer flange 170 of the deformable-nut body 150 is between about 0.0079 inches and about 10.45 inches.

According to some alternative implementations of the present disclosure, the deformable-nut body 150 has a relatively coarse internal thread and the main-nut body 120 has a relatively fine internal thread, where the fine and coarse threads are in time with one another (e.g., aligned). In some such implementations, the fine/coarse self-locking nut is designed to be used with a fine threaded bolt that includes an external thread that corresponds with the fine thread of the main-nut body 120, such that the coarse threads of the deformable-nut body 150 "fit" and thread over the bolt during installation with being stripped. In such an installation, deformable-nut body 150 still deforms as the main-nut body 120 is torqued.

While the main-nut body 120 and the deformable-nut body 150 are shown in FIGS. 10A-10I and described herein as having certain shapes, sizes, dimensions, features, various alternative self-locking nuts having various alternative main-nut bodies and deformable-nut bodies that are similar to the self-locking nut 100 are contemplated. By way of example, self-locking nuts 400, 500, 600, and 700 are described below in reference to FIGS. 11A-14C focusing on the main differences between self-locking nuts 400, 500, 600, and 700 and the self-locking nut 100 describe above. Features, shapes, and sizes of the self-locking nuts 400, 500, 600, and 700 that are not specifically described herein are the same as, or similar to the corresponding feature(s) of the self-locking nut 100.

Figure 10H:
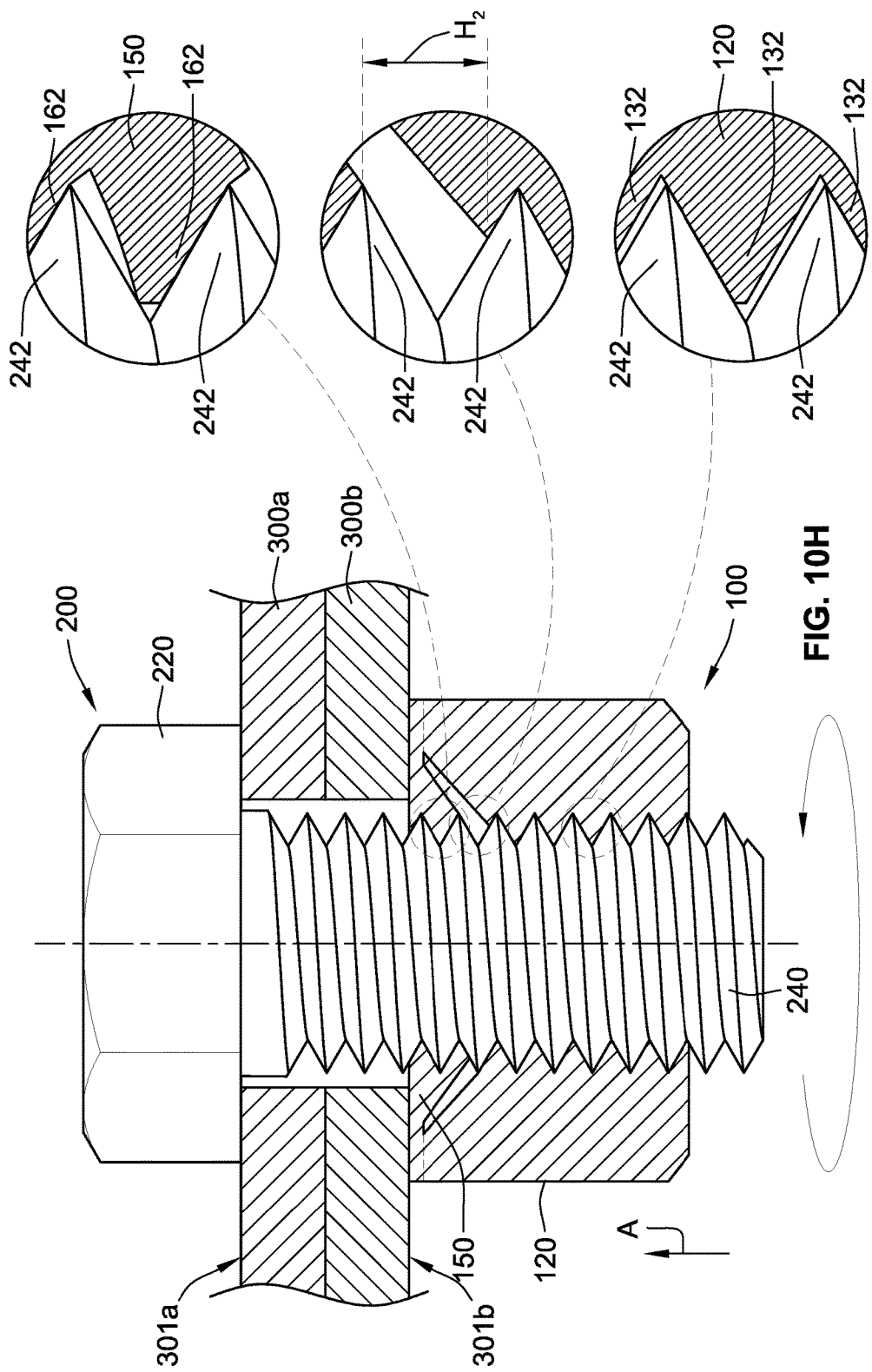
FIG. 10H is a front cross-sectional view of the self-locking nut of FIG. 10A threaded onto the threaded bolt after being fully torqued such that the deformable-nut body of the self-locking nut is deformed and the self-locking nut is locked on the threaded bolt.
Figure 11A:
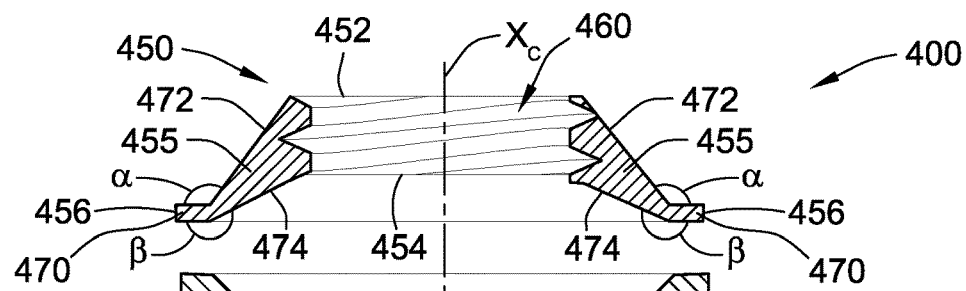
FIG. 11A is an exploded front cross-sectional view of a self-locking nut according to some implementations of the present disclosure.
Figure 11B:
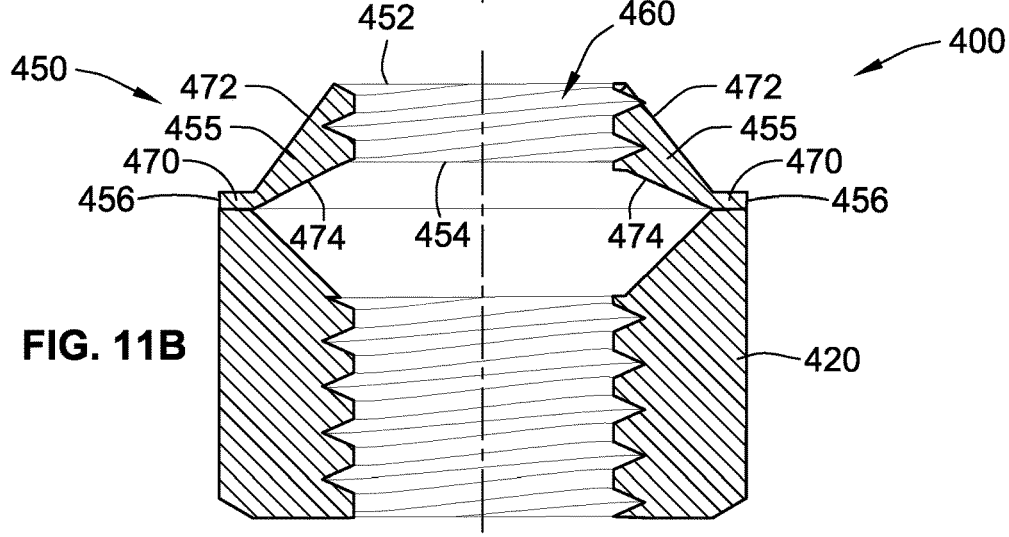
FIG. 11B is an assembled front cross-sectional view of the self-locking nut of FIG. 11B.
Figure 11C:
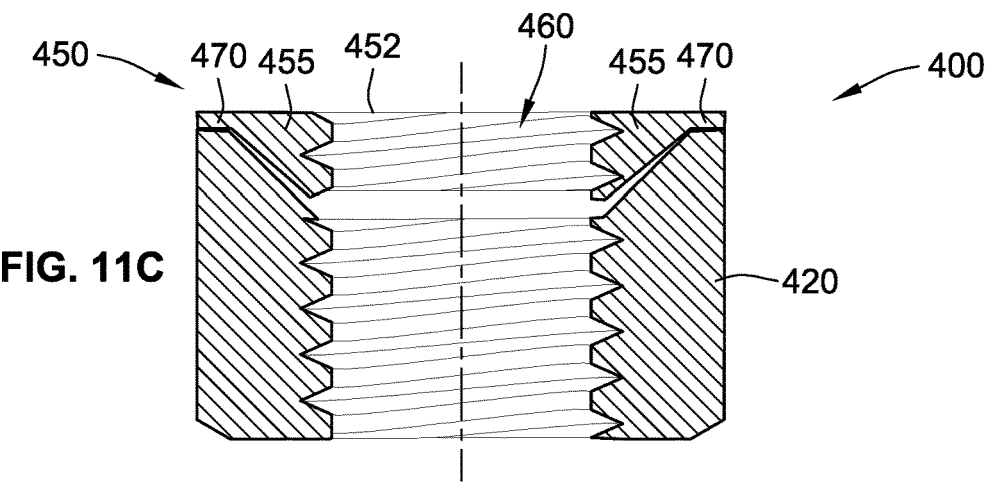
FIG. 11C is a front cross-sectional view of the self-locking nut of FIG. 11B after being installed (e.g., fully torqued on a threaded bolt with the threaded bolt removed for illustrative purposes) showing the deformation of a deformable-nut body of the self-locking nut.

Generally referring to FIGS. 11A-11C, a self-locking nut 400 includes a main-nut body 420 and a deformable-nut body 450 that are the same as, or similar to, the main-nut body 120 and the deformable-nut body 150 described herein. The self-locking nut 400 mainly differs from the self-locking nut 100 in that the deformable-nut body 450 has a different shape than the deformable-nut body 150 (see, e.g., FIG. 10E) prior to installation. As shown in FIG. 11C, after installation of the self-locking nut 400, the deformable-nut body 450 looks similar to the deformable-nut body 150 (FIGS. 10H and 10I).

The deformable-nut body 450 has a central body portion 455 and an outer flange 470, which are the same as, or similar to, the central body portion 155 and the outer flange 170. The central body portion 455 defines an interior threaded bore 460, which is the same as, or similar to the interior threaded bore 160. The deformable-nut body 450 has a front surface 452, an opposing back surface 454, an outer surface 456, an inclined front face 472 (FIGS. 11A and 11B), and an inverted rear face 474 (FIGS. 11A and 11B). As best shown in FIG. 11A, the inclined front face 472 and the inverted rear face 474 are both at angles of α and β, respectively, relative to horizontal and/or relative to the outer flange 470. As shown, the angle α is about one hundred and twenty-five degrees and the angle β is about two hundred and five degrees. Alternatively, in some implementations, the angle α can be any angle between about ninety degrees and about one hundred and fifty degrees (e.g., about 90 degrees, about 100 degrees, about 110 degrees, about 120 degrees, about 130 degrees, about 140 degrees, about 150 degrees, etc.) and the angle β can be any angle between about one hundred and eighty degrees and about two hundred and thirty degrees (e.g., about 180 degrees, about 190 degrees, about 200 degrees, about 210 degrees, about 220 degrees, about 230 degrees, etc.). Any combination of different angles α and β is contemplated.

Figure 12A:
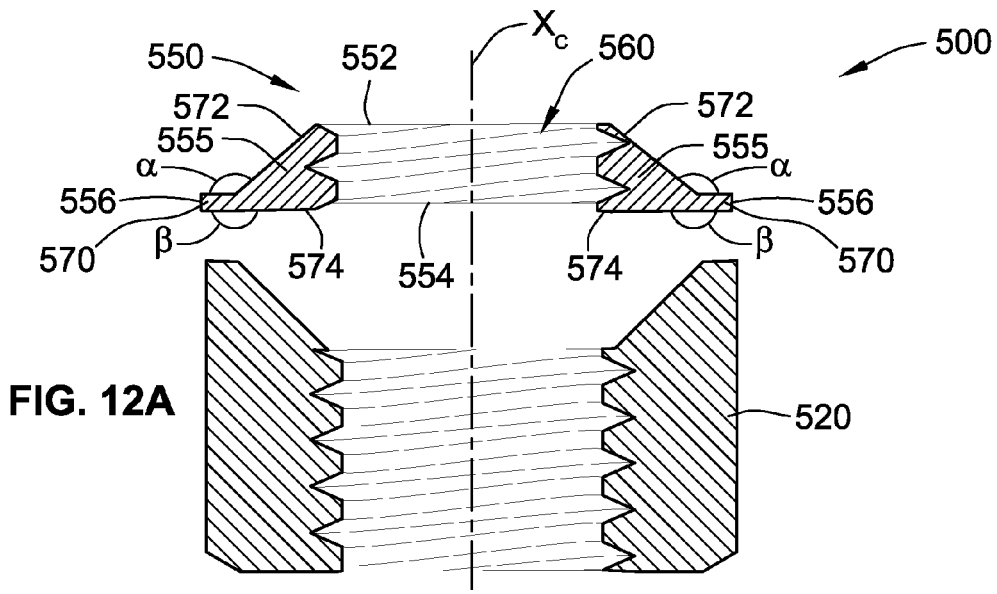
FIG. 12A is an exploded front cross-sectional view of a self-locking nut according to some implementations of the present disclosure.
Figure 12B:
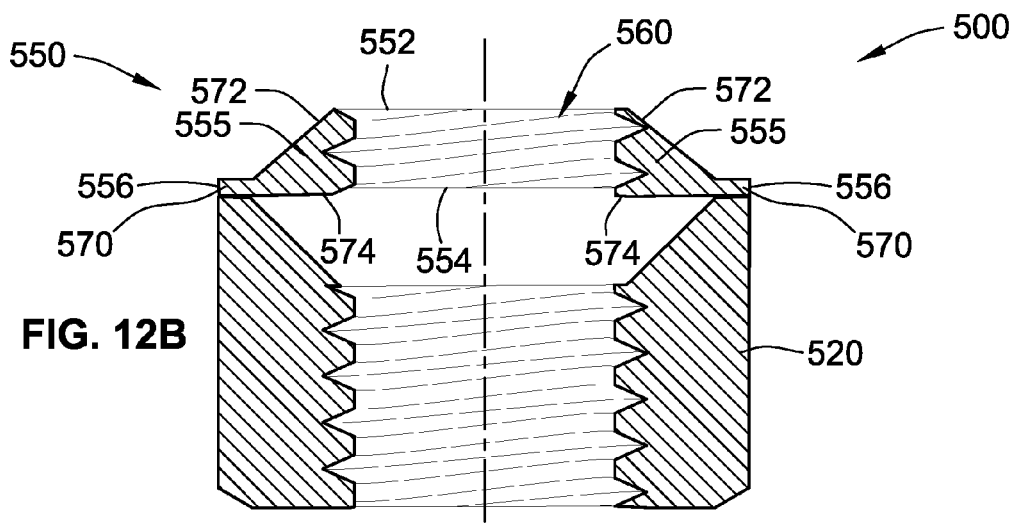
FIG. 12B is an assembled front cross-sectional view of the self-locking nut of FIG. 12B.
Figure 12C:
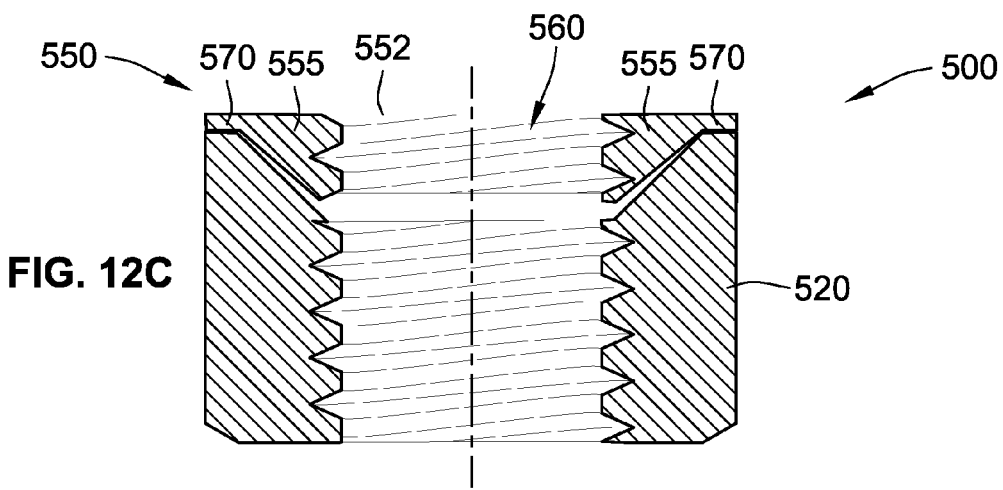
FIG. 12C is a front cross-sectional view of the self-locking nut of FIG. 12B after being installed (e.g., fully torqued on a threaded bolt with the threaded bolt removed for illustrative purposes) showing the deformation of a deformable-nut body of the self-locking nut.

Generally referring to FIGS. 12A-12C, a self-locking nut 500 includes a main-nut body 520 and a deformable-nut body 550 that are the same as, or similar to, the main-nut body 120 and the deformable-nut body 150 described herein. The self-locking nut 500 mainly differs from the self-locking nut 100 in that the deformable-nut body 550 has a different shape than the deformable-nut body 150 (see, e.g., FIG. 10E) prior to installation. As shown in FIG. 12C, after installation of the self-locking nut 500, the deformable-nut body 550 looks similar to the deformable-nut body 150 (FIGS. 10H and 10I).

The deformable-nut body 550 has a central body portion 555 and an outer flange 570, which are the same as, or similar to, the central body portion 155 and the outer flange 170. The central body portion 555 defines an interior threaded bore 560, which is the same as, or similar to the interior threaded bore 160. The deformable-nut body 550 has a front surface 552, an opposing back surface 554, an outer surface 556, an inclined front face 572 (FIGS. 12A and 12B), and a generally flat rear face 574 (FIGS. 12A and 12B). As best shown in FIG. 12A, the inclined front face 572 and the generally flat rear face 574 are both at angles of α and β, respectively, relative to horizontal and/or relative to the outer flange 570. As shown, the angle α is about one hundred and forty degrees and the angle β is about one hundred and eighty degrees. Alternatively, in some implementations, the angle α can be any angle between about ninety degrees and about one hundred and eight degrees (e.g., about 90 degrees, about 100 degrees, about 110 degrees, about 120 degrees, about 130 degrees, about 140 degrees, about 150 degrees, about 160 degrees, about 170 degrees, about 180 degrees, etc.) and the angle β can be any angle between about one hundred and sixty degrees and about two hundred degrees (e.g., about 160 degrees, about 170 degrees, about 180 degrees, about 190 degrees, about 200 degrees, etc.). Any combination of different angles α and β is contemplated.

Figure 13A:
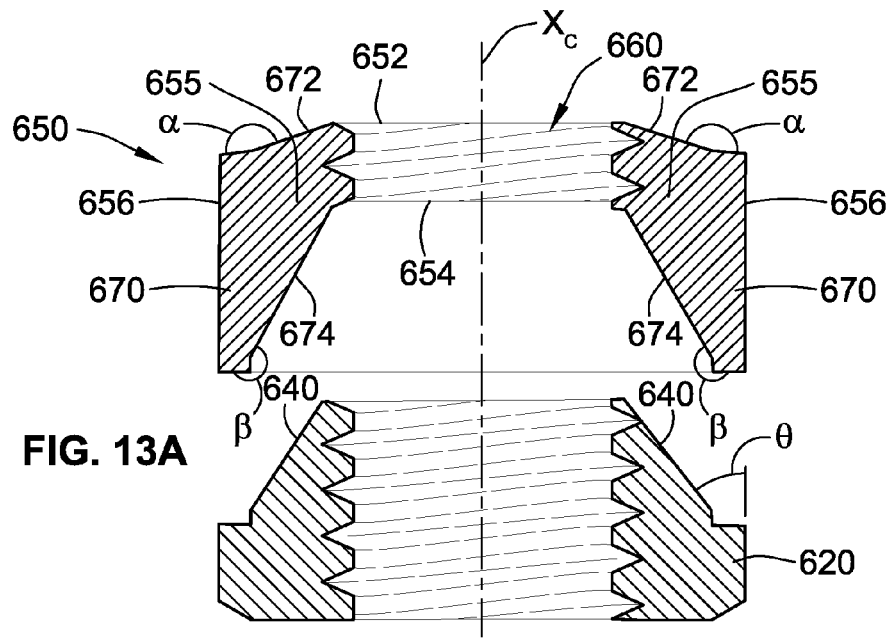
FIG. 13A is an exploded front cross-sectional view of a self-locking nut according to some implementations of the present disclosure.
Figure 13B:
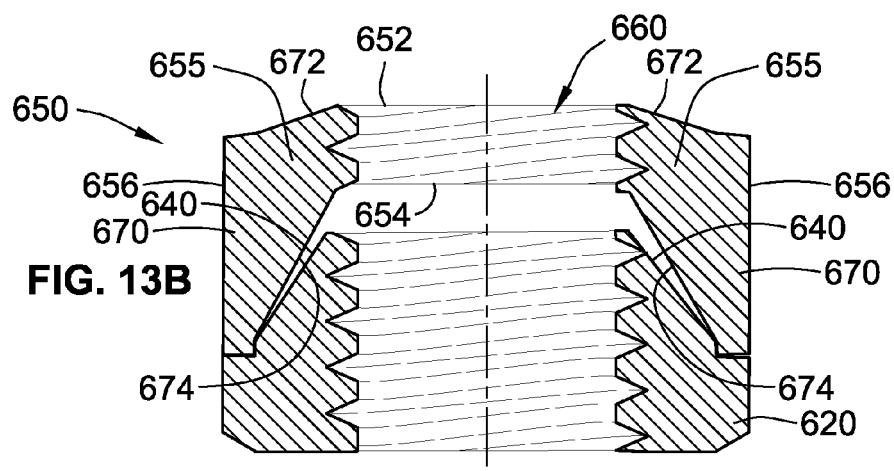
FIG. 13B is an assembled front cross-sectional view of the self-locking nut of FIG. 13B.
Figure 13C:
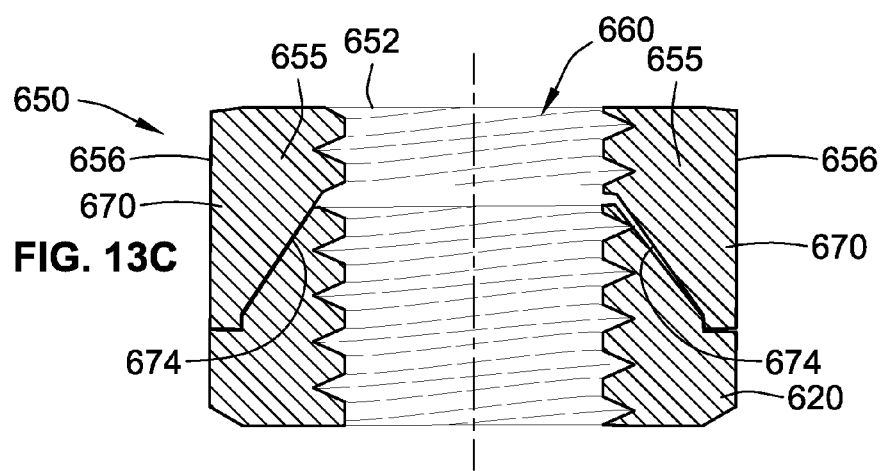
FIG. 13C is a front cross-sectional view of the self-locking nut of FIG. 13B after being installed (e.g., fully torqued on a threaded bolt with the threaded bolt removed for illustrative purposes) showing the deformation of a deformable-nut body of the self-locking nut.

Generally referring to FIGS. 13A-13C, a self-locking nut 600 includes a main-nut body 620 and a deformable-nut body 650 that are the same as, or similar to, the main-nut body 120 and the deformable-nut body 150 described herein. The self-locking nut 600 mainly differs from the self-locking nut 100 in that the deformable-nut body 650 has a different shape than the deformable-nut body 150 (see, e.g., FIG. 10E) and in that the main-nut body 620 has a different shape than the main-nut body 120 (see, e.g., FIGS. 10D and 10E). As shown in FIG. 13C, after installation of the self-locking nut 600, the deformable-nut body 650 deforms in a similar fashion to how the deformable-nut body 150 (FIGS. 10H and 10I) deforms.

Instead of the main-nut body 620 having an inwardly tapered recess, like the inwardly tapered recess 140 of the main-nut body 120, the main-nut body 620 has a protrusion 640 that is outwardly tapered with respect to vertical (e.g., an axis that is parallel with a central axis $X_c$ of the self-locking nut 600) at an angle, θ, of about 45 degrees. Alternatively, the protrusion 640 can be tapered with respect to vertical at an angle, θ, which is between about 30 degrees and about 60 degrees (e.g., about 30 degrees, about 35 degrees, about 40 degrees, about 45 degrees, about 50 degrees, about 55 degrees, about 60 degrees, etc.).

The deformable-nut body 650 has a central body portion 655 and an outer flange 670, which are similar to the central body portion 155 and the outer flange 170, but with a relatively more elongated shape in a direction along a central axis of the self-locking nut 600. Further, the outer flange 670 and the central body portion 655 are merged together such that the outer flange 670 is less like a flange and more like a portion of the central body portion 655. The central body portion 655 defines an interior threaded bore 660, which is the same as, or similar to the interior threaded bore 160. The deformable-nut body 650 has a front surface 652, an opposing back surface 654, an outer surface 656, an inclined front face 672 (FIGS. 13A and 13B), and an inverted rear face 674 (FIGS. 13A and 13B). As best shown in FIG. 13A, the inclined front face 672 and the inverted rear face 674 are both at angles of α and β, respectively, relative to horizontal and/or relative to the outer flange 670. As shown, the angle α is about one hundred and fifty degrees and the angle β is about two hundred and forty degrees. Alternatively, in some implementations, the angle α can be any angle between about ninety degrees and about one hundred and eight degrees (e.g., about 90 degrees, about 100 degrees, about 110 degrees, about 120 degrees, about 130 degrees, about 140 degrees, about 150 degrees, about 160 degrees, about 170 degrees, about 180 degrees, etc.) and the angle β can be any angle between about one hundred and ninety degrees and about two hundred and seventy degrees (e.g., about 190 degrees, about 200 degrees, about 210 degrees, about 220 degrees, about 230 degrees, about 240 degrees, about 250 degrees, about 260 degrees, about 270 degrees, etc.). Any combination of different angles α and β is contemplated.

Generally referring to FIGS. 14A-14C, a self-locking nut 700 includes a main-nut body 720 and a deformable-nut body 750 that are the same as, or similar to, the main-nut body 120 and the deformable-nut body 150 described herein. The self-locking nut 600 mainly differs from the self-locking nut 100 in that the deformable-nut body 650 has a different shape than the deformable-nut body 150 (see, e.g., FIG. 10E) and in that the main-nut body 620 has a different shape than the main-nut body 120 (see, e.g., FIGS. 10D and 10E). Further, the number of turns of a thread of the main-nut body 720 is less than the number of turns of a thread of the deformable-nut body 750, which differs from the self-locking nut 100. As shown in FIG. 14C, after installation of the self-locking nut 700, the deformable-nut body 750 deforms in a similar fashion to how the deformable-nut body 150 (FIGS. 10H and 10I) deforms.

While the main-nut body 720 does have an inwardly tapered recess 740 that is similar to the inwardly tapered recess 140 of the main-nut body 120, the recess 740 is inwardly tapered with respect to a central axis $X_c$ of the self-locking nut 700 at an angle, θ, of about 15 degrees. Alternatively, the recess 740 can tapered with respect to the central axis $X_c$ of the self-locking nut 700 at an angle, θ, which is between about 5 degrees and about 40 degrees (e.g., about 5 degrees, about 10 degrees, about 15 degrees, about 20 degrees, about 25 degrees, about 30 degrees, about 35 degrees, about 40 degrees, etc.).

The deformable-nut body 750 has a central body portion 755 and an outer flange 770, which are similar to the central body portion 155 and the outer flange 170, but with the central body portion 755 having a relatively more elongated shape in a direction along a central axis of the self-locking nut 700. The central body portion 755 defines an interior threaded bore 760, which is the same as, or similar to the interior threaded bore 160, just with relatively more turns of a thread (e.g., five turns of the thread). The deformable-nut body 750 has a front surface 752, an opposing back surface 754, an outer surface 756, an inclined front face 772 (FIGS. 14A and 14B), and an inclined rear face 774 (FIGS. 14A and 14B). As best shown in FIG. 14A, the inclined front face 772 and the inclined rear face 774 are both at angles of α and β, respectively, relative to horizontal and/or relative to the outer flange 770. As shown, the angle α is about one hundred and fifty degrees and the angle β is about one hundred and five degrees. Alternatively, in some implementations, the angle α can be any angle between about ninety degrees and about one hundred and eight degrees (e.g., about 90 degrees, about 100 degrees, about 110 degrees, about 120 degrees, about 130 degrees, about 140 degrees, about 150 degrees, about 160 degrees, about 170 degrees, about 180 degrees, etc.) and the angle β can be any angle between about ninety degrees and about one hundred and forty degrees (e.g., about 90 degrees, about 100 degrees, about 110 degrees, about 120 degrees, about 130 degrees, about 140 degrees, etc.). Any combination of different angles α and β is contemplated.

As described throughout the present disclosure, the self-locking nuts of the present disclosure perform better than standard nuts (i.e., nuts without a deformable-nut body as described herein). Specifically, a self-locking nut incorporating the deformable-nut body can be torqued, without stripping its threads, to a relatively higher value as compared to a standard nut without the deformable-nut body. Such a relatively higher torque results in a correspondingly higher maximum applied clamp load of the self-locking nut as compared with a standard nut. By way of example, the following chart includes data for a number of different sized nuts illustrating the relatively higher maximum torque and relatively higher maximum applied clamp load for self-locking nuts according to the present disclosure as compared with standard SAE Grade 8 nuts.

| Size (nominal maximum diameter of threaded bore of nut) | Threads Per Inch (per inch of nut height) | Maximum Torque (ft-lbs) prior to stripping of threads for a Standard SAE Grade 8 Nut | Maximum Applied Clamp Load (lbs) for a Standard SAE Grade 8 Nut | Maximum Torque (ft-lbs) prior to stripping of threads for a Grade 8 Self-Locking Nut of the Present Disclosure | Maximum Applied Clamp Load (lbs) for a Grade 8 Self-Locking Nut of the Present Disclosure |
|---|---|---|---|---|---|
| 1/4 | 20 | 10.17 | 2,864 | 19.20 | 5,410 |
| 5/16 | 18 | 20.92 | 4,719 | 39.51 | 8,914 |
| 3/8 | 16 | 37.00 | 6,794 | 69.89 | 12,833 |
| 7/16 | 14 | 59.00 | 9,568 | 111.44 | 18,073 |
| 1/2 | 13 | 90.00 | 12,771 | 170.00 | 24,123 |
| 9/16 | 12 | 130.00 | 16,375 | 245.56 | 30,931 |
| 5/8 | 11 | 180.00 | 20,340 | 340.00 | 38,420 |
| 3/4 | 10 | 320.00 | 30,101 | 604.44 | 56,857 |
| 7/8 | 9 | 515.00 | 41,556 | 972.78 | 78,495 |
| 1 | 8 | 772.00 | 54,517 | 1458.22 | 102,977 |
| 1 1/4 | 7 | 1545.00 | 87,220 | 2918.33 | 164,749 |
| 1 1/2 | 6 | 2688.00 | 126,473 | 5077.33 | 238,893 |

The self-locking nuts of the present disclosure are suitable for use in extreme, high vibration and security environments that demands reliability, durability, heavy duty or high performance in a lightweight permanent locking nut. Examples of industrial environments where the self-locking nuts of the present disclosure may be used include:

Aerospace
Automotive
Aviation
Bridges
Buildings
Civil engineering projects
Construction equipment
Dams
Expressways
Extreme environment applications
Guard rails
Heavy duty applications
High vibration applications
Industrial equipment
Machinery
Marine applications
Metal presses
Military equipment
Nuclear power plants
Racing applications
Railroads
Railway cars
Rock crushers
Shipbuilding
Steel-making machinery
Steel towers
Street lights
Traffic lights
Transportation—machinery and infrastructure It is to be understood that many modifications and variations may be devised given the above description of the general principles of the present disclosure. It is intended that all such modifications and variations be considered as within the spirit and scope of the present disclosure, as defined in the following claims.

What is claimed is:

1. A self-locking nut comprising:
   a main-nut body having a recess leading into an interior threaded bore forming more than three turns of an internal thread therein; and
   a deformable-nut body having an outer flange and an interior threaded bore forming less than three turns of an internal thread therein, the outer flange of the deformable-nut body being relatively thinner than the rest of the deformable-nut body such that the outer flange deforms during installation of the self-locking nut on a threaded bolt shaft, the outer flange of the deformable-nut body having a first elastic modulus and the rest of the deformable-nut body having a second elastic modulus that is greater than the first elastic modulus,
   wherein the outer flange of the deformable-nut body is fixed to the main-nut body such that a relief space is formed between the deformable-nut body and the recess.

2. The self-locking nut of claim 1, wherein the outer flange of the deformable-nut body is fixed to the main-nut body such that a generally cylindrical portion of the relief space is established between the interior threaded bore of the deformable-nut body and the interior threaded bore of the main-nut body.

3. The self-locking nut of claim 2, wherein the generally cylindrical portion of the relief space has a first maximum height prior to installation of the self-locking nut on a threaded bolt shaft and wherein the generally cylindrical portion of the relief space is configured to have a second maximum height after installation of the self-locking nut on the threaded bolt shaft, the second maximum height being less than the first maximum height.

4. The self-locking nut of claim 3, wherein second maximum height is less than fifty percent of the first maximum height.

5. The self-locking nut of claim 1, wherein the relief space provides an area for the deformable-nut body to deform into during installation of the self-locking nut on a threaded bolt shaft.

6. The self-locking nut of claim 1, wherein, prior to installation of the self-locking nut on a threaded bolt shaft, a first portion of the deformable-nut body is contained in the recess of the main-nut body.

7. The self-locking nut of claim 6, wherein the deformable-nut body is configured such that after installation of the self-locking nut on the threaded bolt shaft, a second portion of the deformable-nut body is contained in the recess of the main-nut body.

8. The self-locking nut of claim 7, wherein the second portion of the deformable-nut body has a larger volume than the first portion of the deformable-nut body.

9. The self-locking nut of claim 1, wherein the main-nut body has an outer surface that is configured to be engaged by a tool to rotate the self-locking nut about a threaded bolt shaft during installation.

10. The self-locking nut of claim 9, wherein the deformable-nut body has an outer surface that is configured to be engaged by the tool to rotate the self-locking nut about the threaded bolt shaft during installation.

11. The self-locking nut of claim 10, wherein the outer surface of the main-nut body and the outer surface of the deformable-nut body each has a hexagonal outer cross-section.

12. The self-locking nut of claim 9, wherein the outer flange of the deformable-nut body is fixed to the main-nut body such that an outer surface of the deformable-nut body is not co-planar with an outer surface of the main-nut body and the deformable-nut body cannot be engaged by the tool to rotate the self-locking nut about the threaded bolt shaft during installation.

13. The self-locking nut of claim 1, wherein the recess extends from a front surface of the main-nut body towards an opposing back surface of the main-nut body.

14. The self-locking nut of claim 13, wherein the recess is an inwardly tapered recess.

15. The self-locking nut of claim 14, wherein the inwardly tapered recess is annular and at an angle relative to a central axis of the self-locking nut between about 30 degrees and about 75 degrees.

16. The self-locking nut of claim 1, wherein the interior threaded bore of the main-nut body forms between about 3.25 and about 6 turns of the internal thread and the interior threaded bore of the deformable-nut body forms between about 0.5 and about 2.75 turns of the internal thread.

17. The self-locking nut of claim 16, wherein the interior threaded bore of the main-nut body forms about 4 turns of the internal thread and the interior threaded bore of the deformable-nut body forms about 2 turns of the internal thread.

18. The self-locking nut of claim 1, wherein the self-locking nut is made from a first material having a first elastic modulus and the threaded bolt shaft is made from a second material having a second elastic modulus that is greater than the first elastic modulus.

19. A self-locking nut comprising:
a main-nut body having (i) a front surface, (ii) an opposing back surface, (iii) an outer surface configured to be engaged by a tool to rotate the self-locking nut about a threaded bolt shaft thereby causing the main-nut body to move axially in a first direction towards an object, (iv) an interior threaded bore forming a plurality of turns of an internal thread therein, and (v) a recess in the front surface extending into the main-nut body; and
a deformable-nut body having (i) a front surface configured to engage the object thereby limiting axial movement of the deformable-nut body, (ii) an opposing back surface, (iii) an outer surface, (iv) an interior threaded bore forming at least a portion of a turn of an internal thread therein, and (v) an outer flange, the outer flange of the deformable-nut body having a first elastic modulus and the rest of the deformable-nut body having a second elastic modulus that is greater than the first elastic modulus;
wherein the outer flange of the deformable-nut body is attached to the front surface of the main-nut body such that a relief space is formed between a portion of the opposing back surface of the deformable-nut body and the recess, the relief space providing an area for the deformable-nut body to deform into during installation of the self-locking nut on the threaded bolt shaft.

20. The self-locking nut of claim 19, wherein the deformable-nut body has a first shape prior to installation of the self-locking nut on the threaded bolt shaft and is configured to have a different second shape after installation of the self-locking nut on the threaded bolt shaft.

21. The self-locking nut of claim 19, wherein the deformable-nut body to deforms during installation of the self-locking nut on the threaded bolt shaft by flowing into the relief space.

22. The self-locking nut of claim 19, wherein the outer surface of the deformable-nut body is configured to be engaged by the tool to rotate the self-locking nut about the threaded bolt shaft thereby causing the deformable-nut body to move axially in the first direction towards the object.

23. The self-locking nut of claim 19, wherein the interior threaded bore of the deformable-nut body forms less than three complete turns of the internal thread therein.

24. The self-locking nut of claim 19, wherein the interior threaded bore of the deformable-nut body forms less than two complete turns of the internal thread therein.

25. The self-locking nut of claim 19, wherein the interior threaded bore of the deformable-nut body forms less than one complete turn of the internal thread therein.

26. The self-locking nut of claim 19, wherein the internal thread of the main-nut body has the same pitch as the internal thread of the deformable-nut body.

27. The self-locking nut of claim 19, wherein the front surface of the main-nut body is welded to the outer flange of the deformable-nut body.

28. The self-locking nut of claim 19, wherein the recess is an inwardly tapered recess.

29. The self-locking nut of claim 28, wherein the inwardly tapered recess is annular.

30. The self-locking nut of claim 29, wherein the inwardly tapered recess is at an angle relative to a central axis of the self-locking nut between about 30 degrees and about 75 degrees.

31. The self-locking nut of claim 19, wherein the plurality of turns of the internal thread of the main-nut body is at least two complete turns of the internal thread.

32. The self-locking nut of claim 19, wherein the plurality of turns of the internal thread of the main-nut body is at least three complete turns of the internal thread.

33. The self-locking nut of claim 19, wherein the plurality of turns of the internal thread of the main-nut body is at least four complete turns of the internal thread.

34. A method of making a self-locking nut, the method comprising:
providing a main-nut body having a recess leading into an interior threaded bore forming more than three turns of an internal thread therein;
providing a deformable-nut body having an outer flange and an interior threaded bore forming less than three turns of an internal thread therein, the outer flange of the deformable-nut body having a first elastic modulus and the rest of the deformable-nut body having a second elastic modulus that is greater than the first elastic modulus; and fixing the outer flange of the deformable-nut body to the main-nut body such that a relief space is formed between the deformable-nut body and the recess.

35. The method of claim 34, wherein the recess is an inwardly tapered recess.

36. The method of claim 35, wherein the inwardly tapered recess is annular and at an angle relative to a central axis of the self-locking nut between about 30 degrees and about 75 degrees.

37. The method of claim 36, wherein the interior threaded bore of the main-nut body forms between about 3.25 and about 6 turns of the internal thread and the interior threaded bore of the deformable-nut body forms between about 0.5 and about 2.75 turns of the internal thread.

38. The method of claim 37, wherein the interior threaded bore of the main-nut body forms about four turns of the internal thread and the interior threaded bore of the deformable-nut body forms about two turns of the internal thread.

39. The method of claim 34, wherein the relief space provides an area for the deformable-nut body to deform into during installation of the self-locking nut on a threaded bolt shaft.

40. The method of claim 34, wherein the main-nut body is provided with an outer surface that is configured to be engaged by a tool to rotate the self-locking nut about a threaded bolt shaft during installation.

41. The method of claim 40, wherein the deformable-nut body is provided with an outer surface that is configured to be engaged by the tool to rotate the self-locking nut about the threaded bolt shaft during installation.

42. The method of claim 34, wherein the outer flange of the deformable-nut body is fixed to the main-nut body such that (i) the deformable-nut body cannot rotate relative to the main-nut body and (ii) the interior threaded bore of the deformable-nut body is timed with the interior threaded bore of the main-nut body.

43. A method of making a self-locking nut, the method comprising:

providing a deformable-nut body having an outer flange and an interior bore, the outer flange of the deformable-nut body having a first elastic modulus and the rest of the deformable-nut body having a second elastic modulus that is greater than the first elastic modulus;

providing a main-nut body having a recess leading into an interior bore;

fixing the outer flange of the deformable-nut body to the main-nut body such that a relief space is formed between the deformable-nut body and the recess;

tapping the interior bore of the deformable-nut body such that less than three turns of an internal thread are formed therein; and tapping the interior bore of the main-nut body such that more than three turns of an internal thread are formed therein.

44. The method of claim 43, wherein the tapping of the interior bore of the deformable-nut body and the tapping of the interior bore of the main-nut body occurs with the same tool, one after the other.

45. The method of claim 43, wherein the relief space provides an area for the deformable-nut body to deform into during installation of the self-locking nut on a threaded bolt shaft.

46. The method of claim 45, wherein the recess is an inwardly tapered recess at an angle relative to a central axis of the self-locking nut between about 30 degrees and about 75 degrees.

47. A method of permanently locking a self-locking nut on a threaded bolt shaft of a bolt, the self-locking nut having a deformable-nut body fixed to a main-nut body such that a relief space is formed therebetween, the deformable-nut body including an outer flange and an interior threaded bore forming less than three turns of an internal thread therein, the outer flange having a first elastic modulus and the rest of the deformable-nut body having a second elastic modulus that is greater than the first elastic modulus, the main nut-body having a recess leading into an interior threaded bore forming more than three turns of an internal thread therein, the method comprising:

positioning the threaded bolt shaft through an opening in an object such that a portion of the threaded bolt shaft protrudes from the opening;

threading the self-locking nut onto the portion of the threaded bolt shaft protruding from the opening by rotating the self-locking nut in a first rotational direction, thereby causing the self-locking nut to move axially in a first direction towards a surface of the object;

continuing to thread the self-locking nut onto the portion of the threaded bolt shaft such that a front surface of the deformable-nut body abuts the surface of the object; and with the front surface of the deformable-nut body abutting the surface of the object, applying a rotational torque, in the first rotational direction, to the self-locking nut to cause:

(i) the main-nut body to move axially in the first direction, and (ii) the deformable-nut body to deform, thereby entering into the relief space formed between the deformable-nut body and the main-nut body, thereby locking the self-locking nut onto the threaded bolt shaft of the bolt.

48. The method of claim 47, wherein the deformable-nut body has an outer flange and an interior threaded bore forming less than three turns of an internal thread therein.

49. The method of claim 48, wherein the main-nut body has an inwardly tapered recess leading into an interior threaded bore forming more than three turns of an internal thread therein.

50. The method of claim 47, further comprising applying a lubricant to at least the front surface of the deformable-nut body.

51. The method of claim 47, wherein the applying the rotational torque includes engaging a non-rotational feature of the self-locking nut with a wrench.

52. The method of claim 47, wherein the applying the rotational torque causes a height of the relief space to be reduced from a first maximum height to a second maximum height.

53. The method of claim 52, wherein second maximum height is less than fifty percent of the first maximum height.

54. The method of claim 52, wherein the height of the relief space is measured along a central axis of the self-locking nut.

55. A self-locking nut comprising:

a main-nut body having a recess leading into an interior threaded bore forming x turns of an internal thread therein; and a deformable-nut body having an outer flange and an interior threaded bore forming y turns of an internal thread therein, the outer flange having a first elastic modulus and the rest of the deformable-nut body having a second elastic modulus that is greater than the first elastic modulus, wherein the outer flange of the deformable-nut body is fixed to the main-nut body such that a relief space is formed between the deformable-nut body and the recess, and wherein x is greater than y.

56. The self-locking nut of claim 55, wherein a ratio of x:y is about 2:1.

57. The self-locking nut of claim 55, wherein a ratio of x:y is about 3:1.

58. The self-locking nut of claim 55, wherein a ratio of x:y is about 4:1.

* * * * *